(12) United States Patent
Liu et al.

(10) Patent No.: US 12,199,506 B2
(45) Date of Patent: Jan. 14, 2025

(54) SWITCHED CAPACITOR VOLTAGE CONVERTER CIRCUIT AND CONTROL METHOD OF SWITCHED CAPACITOR CONVERTER

(71) Applicant: Richtek Technology Corporation, Zhubei (TW)

(72) Inventors: Kuo-Chi Liu, Hsinchu (TW); Ta-Yung Yang, Taoyuan (TW); Wei-Hsu Chang, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 117 days.

(21) Appl. No.: 18/312,512

(22) Filed: May 4, 2023

(65) Prior Publication Data

US 2023/0396162 A1    Dec. 7, 2023

Related U.S. Application Data

(60) Provisional application No. 63/347,612, filed on Jun. 1, 2022.

(30) Foreign Application Priority Data

Jan. 3, 2023  (TW) ................. 112100081

(51) Int. Cl.
*H02M 3/07* (2006.01)
*H02M 1/00* (2006.01)
*H02M 3/158* (2006.01)

(52) U.S. Cl.
CPC ........... *H02M 3/07* (2013.01); *H02M 1/0009* (2021.05); *H02M 1/0032* (2021.05); *H02M 1/0095* (2021.05); *H02M 3/158* (2013.01)

(58) Field of Classification Search
CPC ...... H02M 3/07; H02M 1/0009; H02M 3/015; H02M 1/0095; H02M 1/0032; H02M 1/10;
(Continued)

(56) References Cited

U.S. PATENT DOCUMENTS 8,351,228 B2 * 1/2013 Izumi ................. H02M 3/07
363/60
9,667,139 B2 * 5/2017 Giuliano .............. H02M 3/158
(Continued)

OTHER PUBLICATIONS

Yousefzadeh V., et al., "Three-Level Buck Converter for Envelope Tracking in RF Power Amplifiers", IEEE Applied Power Electronics Conference and Exposition 2005 (APEC 2005), vol. 3, Mar. 6-10, 2005, pp. 1588-1594.

*Primary Examiner* — Yusef A Ahmed
(74) *Attorney, Agent, or Firm* — Tung & Associates

(57) ABSTRACT

A switched capacitor voltage converter circuit for converting a first voltage to a second voltage includes: an output capacitor; a switched capacitor converter; and a control circuit. The switched capacitor converter includes: a switch circuit including fourth switches; an inductor coupled between the switch circuit and the output capacitor; and a flying capacitor coupled to the switch circuit, wherein the flying capacitor and the output capacitor constitute a voltage divider. The control circuit generates a PWM signal according to the second voltage and generates switch signals according to the PWM signal to control the switch circuit, so as to convert the first voltage to the second voltage. The control circuit decides whether the switched capacitor converter operates in a boundary conduction mode, a discontinuous conduction mode or a continuous conduction mode according to an output current or an output current related signal.

19 Claims, 24 Drawing Sheets

(58) Field of Classification Search
CPC .... H02M 1/0058; H02M 3/01; H02M 3/1584; Y02B 70/10
See application file for complete search history.

(56) References Cited

U.S. PATENT DOCUMENTS

| | | | | |
|---|---|---|---|---|
| 9,793,804 | B2* | 10/2017 | Zhang | H02M 3/158 |
| 9,917,517 | B1* | 3/2018 | Jiang | H02M 1/34 |
| 10,063,146 | B1* | 8/2018 | Lee | G01R 19/003 |
| 10,651,731 | B1* | 5/2020 | Rainer | H02M 3/1588 |
| 11,165,335 | B2* | 11/2021 | Sblano | H02M 3/1584 |
| 2005/0146311 | A1* | 7/2005 | Kuo | H02M 1/38 |
| | | | | 323/282 |
| 2007/0018617 | A1* | 1/2007 | Endo | H02M 3/158 |
| | | | | 323/222 |
| 2009/0040791 | A1* | 2/2009 | Qahouq | H02M 3/1588 |
| | | | | 363/21.01 |
| 2011/0031951 | A1* | 2/2011 | Chen | H02M 3/1582 |
| | | | | 323/288 |
| 2012/0119720 | A1* | 5/2012 | Li | H02M 3/158 |
| | | | | 323/284 |
| 2015/0357912 | A1* | 12/2015 | Perreault | H02M 3/33569 |
| | | | | 363/126 |
| 2016/0105110 | A1* | 4/2016 | Houston | H02J 7/00 |
| | | | | 323/271 |
| 2018/0375429 | A1* | 12/2018 | Trichy | H02M 3/158 |
| 2019/0028025 | A1* | 1/2019 | Babazadeh | H01L 27/088 |
| 2020/0177081 | A1* | 6/2020 | Huang | H02M 3/07 |
| 2020/0204071 | A1* | 6/2020 | Huang | H02M 3/07 |
| 2021/0328507 | A1* | 10/2021 | Liu | H02M 1/0095 |
| 2021/0351695 | A1* | 11/2021 | Liu | H02M 3/155 |
| 2021/0367511 | A1* | 11/2021 | Liu | H02M 3/01 |
| 2021/0367520 | A1* | 11/2021 | Liu | H02M 3/158 |
| 2021/0376717 | A1* | 12/2021 | Liu | H02M 3/01 |
| 2021/0384820 | A1* | 12/2021 | Liu | H02M 1/007 |
| 2021/0399621 | A1* | 12/2021 | Liu | H02M 3/01 |
| 2022/0029531 | A1* | 1/2022 | Liu | H02M 3/01 |
| 2022/0052675 | A1* | 2/2022 | Archibald | H03K 3/037 |
| 2022/0140726 | A1* | 5/2022 | Liu | H02M 1/0095 |
| | | | | 323/271 |
| 2022/0352816 | A1* | 11/2022 | Liu | H02M 3/07 |
| 2022/0368218 | A1* | 11/2022 | Liu | H02M 3/01 |
| 2023/0028873 | A1* | 1/2023 | Liu | H02M 3/07 |
| 2023/0170795 | A1* | 6/2023 | Yoo | H02M 1/08 |
| | | | | 323/271 |
| 2023/0179093 | A1* | 6/2023 | Liu | H02M 1/0058 |
| | | | | 323/271 |
| 2023/0223843 | A1* | 7/2023 | Liu | H02M 1/083 |
| | | | | 363/21.02 |
| 2023/0231479 | A1* | 7/2023 | Lee | H02M 1/083 |
| | | | | 323/235 |
| 2023/0246548 | A1* | 8/2023 | Liu | H02M 3/07 |
| | | | | 323/271 |
| 2023/0361674 | A1* | 11/2023 | Liu | H02M 1/0009 |
| 2023/0412073 | A1* | 12/2023 | Ge | H02M 3/077 |
| 2024/0072633 | A1* | 2/2024 | Liu | H02M 3/07 |
| 2024/0186887 | A1* | 6/2024 | Yang | H02M 3/156 |
| 2024/0223086 | A1* | 7/2024 | Liu | H02M 1/0058 |
| 2024/0235370 | A1* | 7/2024 | Liu | H02M 1/0095 |
| 2024/0297580 | A1* | 9/2024 | Liu | H02M 3/07 |

* cited by examiner

SWITCHED CAPACITOR VOLTAGE CONVERTER CIRCUIT AND CONTROL METHOD OF SWITCHED CAPACITOR CONVERTER

CROSS REFERENCE

The present invention claims priority to U.S. 63/347,612 filed on Jun. 1, 2022 and claims priority to TW 112100081 filed on Jan. 3, 2023.

BACKGROUND OF THE INVENTION

Field of Invention

The present invention relates to a switched capacitor voltage converter circuit and a control method of a switched capacitor converter; particularly, it relates to such switched capacitor voltage converter circuit capable of switching among different modes according to an output current, and a control method of a switched capacitor converter.

Description of Related Art

In "Three-Level Buck Converter for Envelope Tracking in RF Power Amplifiers", by Yousefzadeh V., et al., IEEE Applied Power Electronics Conference and Exposition 2005 (APEC 2005), vol. 3, Mar. 6-10, 2005, pp. 1588-1594, a three-level buck converter is proposed for use in envelope tracking, such as for use in envelope tracking in RF power amplifiers. This prior art demonstrates that the three-level buck converter has merits of a relatively lower voltage stress and a relatively smaller ripple current, as compared to a conventional three-level buck converter.

Please refer to FIG. 1, which shows a schematic diagram of a conventional three-level buck converter disclosed in U.S. Pat. No. 9,793,804. In this prior art, two three-level buck converters 120 and 130 are operated according to four clock signals CLK. In this prior art, the clock signals have a 90° phase difference relative to one another. The Pulse Width Modulation (PWM) controllers 110 and 115 generate respective PWM signals Spwm according to the clock signals CLK. The buck converter 120 and the buck converter 130 generate output voltages Vo1 and Vo2, respectively, according to the PWM signal Spwm generated by the PWM controller 110 and the PWM signal Spwm generated by the PWM controller 115.

As compared to the aforementioned prior arts, the present invention provides an innovative switched capacitor voltage converter circuit and a control method of a switched capacitor converter.

SUMMARY OF THE INVENTION

From one perspective, the present invention provides a switched capacitor voltage converter circuit, which is configured to operably convert a first voltage to a second voltage; the switched capacitor voltage converter circuit comprising: an output capacitor, which is configured to operably generate the second voltage; a switched capacitor converter, which is coupled between the first voltage and the second voltage, wherein the switched capacitor converter includes: a switching circuit including a first switch, a second switch, a third switch and a fourth switch, wherein the first switch is coupled to the first voltage, so that the first switch is configured to operably receive the first voltage; an inductor, which is coupled between the output capacitor and the switching circuit; and a flying capacitor coupled to the switch circuit, wherein the flying capacitor and the output capacitor constitute a voltage divider; and a control circuit, which is configured to operably generate at least one pulse width modulation (PWM) signal according to the second voltage, and the control circuit is configured to operably generate a plurality of switching signals according to the at least one PWM signal, wherein the plurality of switching signals are configured to operably control the first switch, the second switch, the third switch and the fourth switch in the switching circuit, so as to convert the first voltage to the second voltage; wherein the control circuit is configured to operably decide whether the switched capacitor converter operates in a boundary conduction mode (BCM), a discontinuous conduction mode (DCM) or a continuous conduction mode (CCM) according to an output current or an output current related signal.

In one embodiment, the control circuit is further configured to operably generate a zero current signal according to a time point at which an inductor current flowing through the inductor is zero current, so that the switched capacitor converter operates in the BCM or in the DCM.

In one embodiment, when the output current or the output current related signal is lower than a first current threshold, the control circuit controls the switched capacitor converter to operate in the DCM; when the output current or the output current related signal is higher than a second current threshold, the control circuit controls the switched capacitor converter to operate in the CCM; and when the output current or the output current related signal lies between the first current threshold and the second current threshold, the control circuit controls the switched capacitor converter to operate in the BCM.

In one embodiment, the control circuit is configured to operably adjust the plurality of switching signals, so as to accomplish zero current switching or zero voltage switching of soft switching.

In one embodiment, the control circuit operates with a constant switch frequency by adjusting an OFF period of the first switch, the second switch, the third switch or the fourth switch.

In one embodiment, the control circuit includes: a PWM circuit, which is configured to operably generate the at least one PWM signal according to the second voltage, wherein the at least one PWM signal includes a first PWM signal, wherein the PWM circuit includes: a lock-up circuit, which is configured to operably lock the second voltage at a reference voltage, to generate a voltage locked signal; a first ramp circuit, which is configured to operably generate a first ramp signal; and a first comparison circuit, which is configured to operably compare the voltage locked signal with the first ramp signal, so as to generate the first PWM signal.

In one embodiment, the at least one PWM signal includes a second PWM signal, wherein the PWM circuit further includes: a second ramp circuit, which is configured to operably generate a second ramp signal; and a second comparison circuit, which is configured to operably compare the voltage locked signal with the second ramp signal, so as to generate the second PWM signal; wherein the second ramp signal has a first phase-shift relative to the first ramp signal.

In one embodiment, the first ramp circuit includes a first reset circuit, which is configured to operably reset the first ramp signal in accordance with a zero current detection signal or a first trigger signal generated from a clock signal; and the second ramp circuit includes a second reset circuit, which is configured to operably reset the second ramp signal in accordance with the zero current detection signal or a second trigger signal generated from the clock signal; wherein the second trigger signal has a second phase-shift relative to the first trigger signal.

In one embodiment, an amount of the first phase-shift is equal to an amount of the second phase-shift.

In one embodiment, the plurality of switching signals are adjusted according to the first PWM signal and the second PWM signal, so as to regulate the second voltage.

In one embodiment, the third switch is coupled between the first switch and the inductor, so that the switching signal configured to control the first switch is adjusted according to the first PWM signal, whereas, the switching signal configured to control the third switch is adjusted according to the second PWM signal.

In one embodiment, the control circuit is configured to operably decide whether the switched capacitor converter operates in the BCM, in the DCM or in the CCM further according to (1) and (2) below: (1) a switching frequency of the first switch, the second switch, the third switch or the fourth switch; and (2) the output current or the output current related signal.

In one embodiment, when the switching frequency is higher than a predetermined frequency threshold, the control circuit controls the switched capacitor converter to cease operating in the BCM.

In one embodiment, the control circuit includes a mode control circuit, which is configured to operably decide whether the switched capacitor converter operates in the BCM, in the DCM or in the CCM according to the output current or the output current related signal. The mode control circuit includes: a current sensing circuit, which is configured to operably sense the output current or the output current related signal, to generate a current sensing signal; and a comparison circuit, which is configured to operably compare the current sensing signal with a first current threshold and a second current threshold, to generate a boundary conduction signal, a discontinuous conduction signal or a continuous conduction signal; wherein when the current sensing signal is greater than the first current threshold, the continuous conduction signal is switched to an enable level, so that the switched capacitor converter operates in the CCM; wherein when the current sensing signal is smaller than the second current threshold, the discontinuous conduction signal is switched to the enable level, so that the switched capacitor converter operates in the DCM; and wherein when the current sensing signal lies between the first current threshold and the second current threshold, the boundary conduction signal is switched to the enable level, so that the switched capacitor converter operates in the BCM.

In one embodiment, in the CCM: a time point at which the plurality of switching signals are switched to an enable level is determined by a clock signal or is determined by (1) or (2) below: (1) the first ramp signal and the voltage locked signal or (2) the second ramp signal and the voltage locked signal; a time point at which the plurality of switching signals are switched to a disable level is determined by the clock signal or is determined by (1) or (2) below: (1) the first ramp signal and the voltage locked signal or (2) the second ramp signal and the voltage locked signal.

In one embodiment, in the DCM: a time point at which the plurality of switching signals are switched to an enable level is determined by a clock signal or is determined by (1) or (2) below: (1) the first ramp signal and the voltage locked signal or (2) the second ramp signal and the voltage locked signal; a time point at which the plurality of switching signals are switched to a disable level is determined by the clock signal or is determined by (1) or (2) below: (1) the first ramp signal and the voltage locked signal or (2) the second ramp signal and the voltage locked signal.

In one embodiment, in the BCM: a time point at which the plurality of switching signals are switched to an enable level is determined by a zero current detection signal or is determined by (1) or (2) below: (1) the first ramp signal and the voltage locked signal or (2) the second ramp signal and the voltage locked signal; a time point at which the plurality of switching signals are switched to a disable level is determined by the zero current detection signal or is determined by (1) or (2) below: (1) the first ramp signal and the voltage locked signal or (2) the second ramp signal and the voltage locked signal.

From another perspective, the present invention provides a control method of a switched capacitor converter, which is configured to operably convert a first voltage to a second voltage; the control method of the switched capacitor converter comprising following steps: generating at least one pulse width modulation (PWM) signal according to the second voltage; generating a plurality of switching signals according to the at least one PWM signal, wherein the plurality of switching signals are configured to operably control the switched capacitor converter, so as to convert the first voltage to the second voltage; and deciding whether the switched capacitor converter operates in a boundary conduction mode (BCM), a discontinuous conduction mode (DCM) or a continuous conduction mode (CCM) according to an output current or an output current related signal.

In one embodiment, the control method of the switched capacitor converter further comprises: generating a zero current signal according to a time point at which an inductor current flowing through the inductor is zero current, so that the switched capacitor converter operates in the BCM or in the DCM.

In one embodiment, the step for deciding whether the switched capacitor converter operates in the BCM, the DCM or the CCM according to the output current or the output current related signal further includes: when the output current or the output current related signal is lower than a first current threshold, controlling the switched capacitor converter to operate in the DCM; when the output current or the output current related signal is higher than a second current threshold, controlling the switched capacitor converter to operate in the CCM; or when the output current or the output current related signal lies between the first current threshold and the second current threshold, controlling the switched capacitor converter to operate in the BCM.

In one embodiment, the control method of the switched capacitor converter further comprises: adjusting the plurality of switching signals, so as to accomplish zero current switching or zero voltage switching of soft switching.

In one embodiment, the control method of the switched capacitor converter further comprises: operating the plurality of switching signals with a constant switching frequency by adjusting an OFF period of the first switch, the second switch, the third switch or the fourth switch.

In one embodiment, the at least one PWM signal includes a first PWM signal and a second PWM signal, wherein the step for generating the at least one PWM signal according to the second voltage further includes: locking the second voltage at a reference voltage, to generate a voltage locked signal; generating a first ramp signal; comparing the voltage locked signal with the first ramp signal, to generate the first PWM signal; generating a second ramp signal; and comparing the voltage locked signal with the second ramp signal, to generate the second PWM signal; wherein the second ramp signal has a first phase-shift relative to the first ramp signal.

In one embodiment, the step for generating the at least one PWM signal according to the second voltage includes following steps: resetting the first ramp signal in accordance with a zero current detection signal or a first trigger signal generated from a clock signal; and resetting the second ramp signal in accordance with the zero current detection signal or a second trigger signal generated from the clock signal; wherein the second trigger signal has a second phase-shift relative to the first trigger signal.

In one embodiment, an amount of the first phase-shift is equal to an amount of the second phase-shift.

In one embodiment, the control method of the switched capacitor converter further comprises following steps: adjusting the plurality of switching signals according to the first PWM signal and the second PWM signal, so as to regulate the second voltage.

In one embodiment, the switched capacitor voltage converter includes: a first switch, a second switch, a third switch, a fourth switch and an inductor, wherein the third switch is coupled between the first switch and the inductor, wherein the step for adjusting the plurality of switching signals according to the first PWM signal and the second PWM signal includes following steps: adjusting the switching signal configured to control the first switch according to the first PWM signal; and adjusting the switching signal configured to control the third switch according to the second PWM signal.

In one embodiment, the switched capacitor voltage converter includes: a first switch, a second switch, a third switch and a fourth switch, and the control method of the switched capacitor converter further comprises following steps: deciding whether the switched capacitor converter operates in the BCM, in the DCM or in the CCM further according to (1) and (2) below: (1) a switching frequency of the first switch, the second switch, the third switch or the fourth switch; and (2) the output current or the output current related signal.

In one embodiment, the step for deciding whether the switched capacitor converter operates in the BCM, in the DCM or in the CCM includes following steps: when the switching frequency is higher than a predetermined frequency threshold, controlling the switched capacitor converter to cease operating in the BCM.

In one embodiment, the step for deciding whether the switched capacitor converter operates in the BCM, the DCM or the CCM according to the output current or the output current related signal further includes following steps: sensing the output current or the output current related signal, to generate a current sensing signal; and comparing the current sensing signal with a first current threshold and a second current threshold, to generate a boundary conduction signal, a discontinuous conduction signal or a continuous conduction signal; wherein when the current sensing signal is greater than a first current threshold, the continuous conduction signal is switched to an enable level, so that the switched capacitor converter operates in the CCM; wherein when the current sensing signal is smaller than a second current threshold, the discontinuous conduction signal is switched to the enable level, so that the switched capacitor converter operates in the DCM; and wherein when the current sensing signal lies between the first current threshold and the second current threshold, the boundary conduction signal is switched to the enable level, so that the switched capacitor converter operates in the BCM.

Advantages of the present invention include: that, the present invention can automatically switch among a boundary conduction mode (BCM), a discontinuous conduction mode (DCM) and a continuous conduction mode (CCM), so as to optimize efficiency; and that, the present invention can flexibly switch among different operation modes according to an output current or a switching frequency; and that, when the present invention operates in the BCM or in the DCM, it is not required for the present invention to execute voltage balancing for the flying capacitor; and that, the present invention can accomplish zero current switching or zero voltage switching, so as to reduce power loss during switching; and that, the present invention can adaptively adjust the switching frequency when operating in the BCM; and that, the present invention has a better efficiency, as compared to prior art three-level buck converters.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
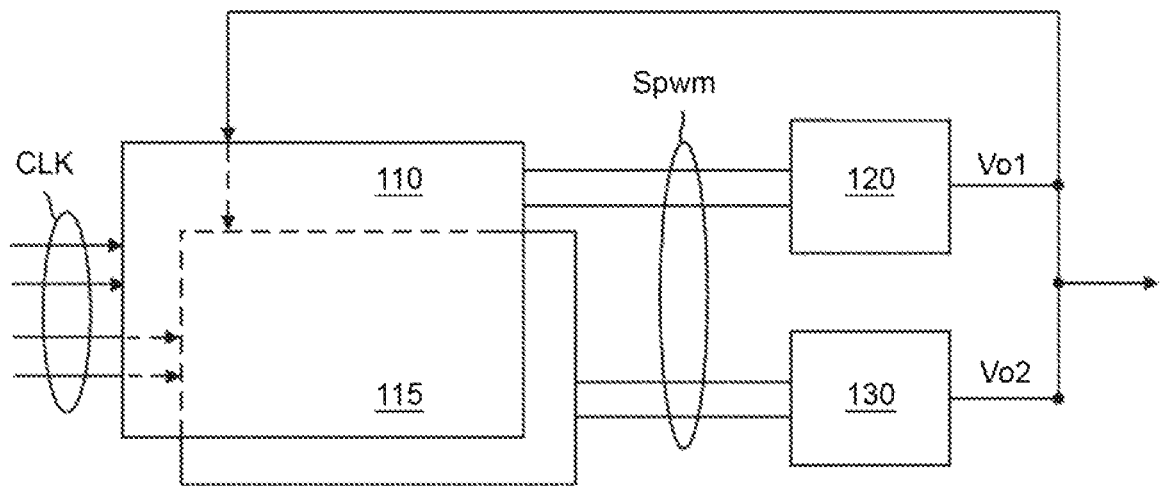
FIG. 1 shows a schematic diagram of a conventional three-level buck converter.
Figure 2A:
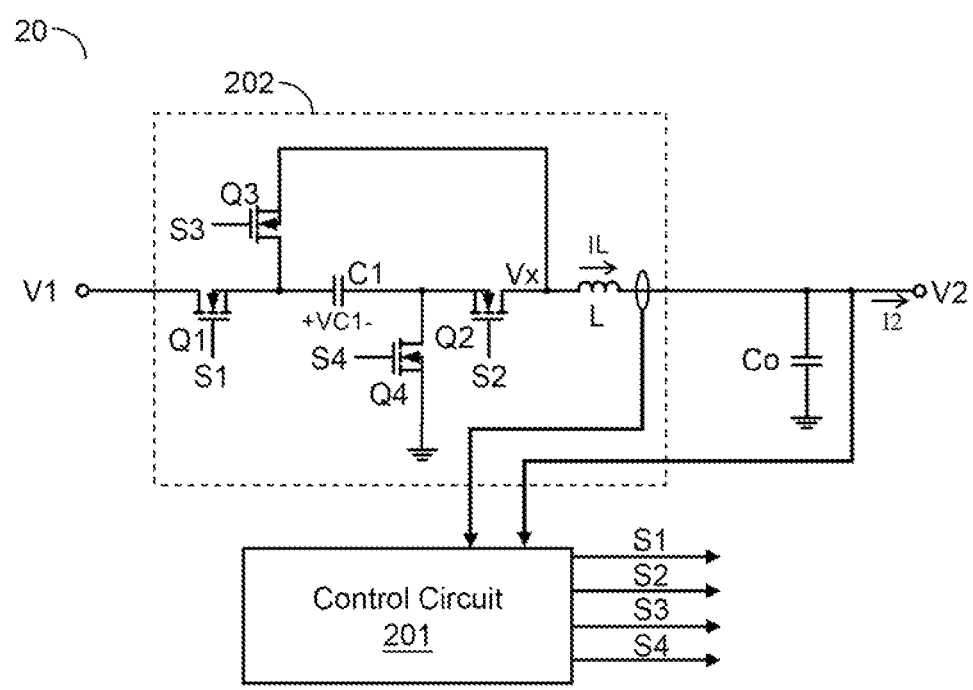
FIG. 2A shows a schematic circuit diagram of a switched capacitor voltage converter circuit according to an embodiment of the present invention.
Figure 2B:
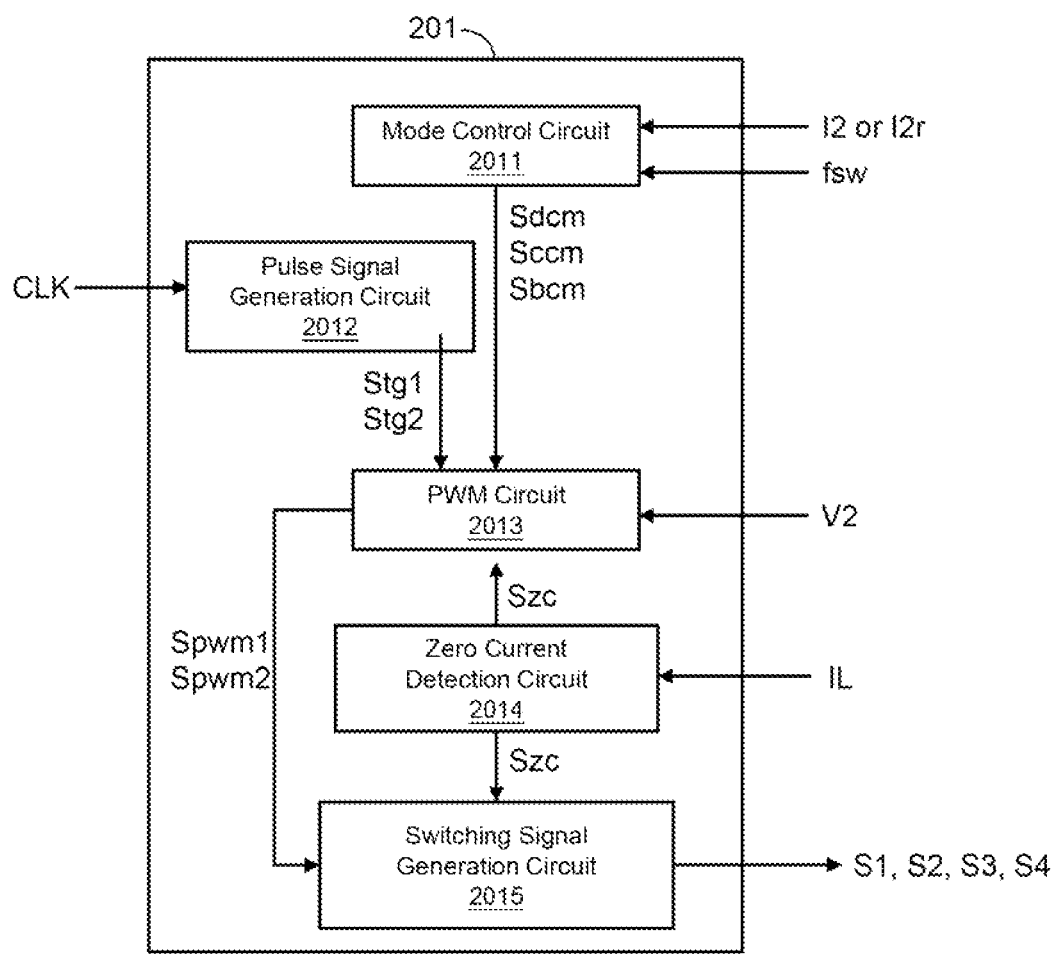
FIG. 2B shows a schematic circuit block diagram of a control circuit in a switched capacitor voltage converter circuit according to an embodiment of the present invention.

FIG. 2A shows a schematic circuit diagram of a switched capacitor voltage converter circuit according to an embodiment of the present invention. FIG. 2B shows a schematic circuit block diagram of a control circuit in a switched capacitor voltage converter circuit according to an embodiment of the present invention. As shown in FIG. 2A, the switched capacitor voltage converter circuit 20 is configured to operably convert a first voltage V1 to a second voltage V2. The switched capacitor voltage converter circuit 20 comprises: an output capacitor Co, a switched capacitor converter 202 and a control circuit 201. The output capacitor Co is configured to operably generate the second voltage V2. The switched capacitor converter 202 is coupled between the first voltage V1 and the second voltage V2. The switched capacitor converter 202 includes: a switch Q1, a switch Q2, a switch Q3, a switch Q4, a resonant inductor L and a flying capacitor C1. The switch Q1, the switch Q2, the switch Q3 and the switch Q4 constitute a switching circuit. The switch Q1 is coupled to the first voltage V1, so that the switch Q1 is configured to operably receive the first voltage V1.

The inductor L is coupled between the output capacitor Co and the switching circuit. The flying capacitor C1 is coupled to the switch circuit. The flying capacitor C1 and the output capacitor Co constitute a voltage divider when the switched capacitor voltage converter circuit 20 is in normal operation. The control circuit 201 is configured to operably generate at least one pulse width modulation (PWM) signal (the details of which will be elaborated later) according to the second voltage V2, and the control circuit 201 is configured to operably generate switching signals S1~S4 according to the at least one PWM signal, wherein the switching signal S1, the switching signal S2, the switching signal S3 and the switching signal S4 are configured to operably control the switch Q1, the switch Q2, the switch Q3 and the switch Q4 in the switching circuit, respectively, so as to convert the first voltage V1 to the second voltage V2.

Please refer to FIG. 2A along with FIG. 2B. The control circuit 201 is configured to operably decide whether the switched capacitor converter 202 operates in a boundary conduction mode (BCM), a discontinuous conduction mode (DCM) or a continuous conduction mode (CCM) according to an output current I2 or an output current related signal I2r (the output current related signal for example can be, but is not limited to, an inductor current IL). When the output current I2 or the output current related signal I2r is lower than a first current threshold, the control circuit 201 controls the switched capacitor converter 202 to operate in the DCM. When the output current I2 or the output current related signal I2r is higher than a second current threshold, the control circuit 201 controls the switched capacitor converter 202 to operate in the CCM. When the output current I2 or the output current related signal I2r lies between the first current threshold and the second current threshold, the control circuit 201 controls the switched capacitor converter 202 to operate in the BCM.

As shown in FIG. 2B, the control circuit 201 includes: a mode control circuit 2011, a pulse signal generation circuit 2012, a PWM circuit 2013, a zero current detection circuit 2014 and a switching signal generation circuit 2015. The mode control circuit 2011 is configured to operably generate a boundary conduction signal Sbcm, a discontinuous conduction signal Sdcm or a continuous conduction signal Sccm according to the output current I2 or the output current related signal I2r and/or a switching frequency fsw, so as to decide whether the switched capacitor converter 202 operates in the BCM, in the DCM or in the CCM. The pulse signal generation circuit 2012 is configured to operably generate a trigger signal Stg1 and a trigger signal Stg2.

The PWM circuit 2013 is configured to operably generate a PWM signal Spwm1 and a PWM signal Spwm2 according to the boundary conduction signal Sbcm, the discontinuous conduction signal Sdcm, the continuous conduction signal Sccm, the trigger signal Stg1, the trigger signal Stg2, a zero current detection signal Szc and the second voltage V2, wherein the generated PWM signal Spwm1 and the resulted PWM signal Spwm2 are sent to the switching signal generation circuit 2015, so that the switching signal generation circuit 2015 generates the switching signals S1~S4 accordingly. The zero current detection circuit 2014 is configured to operably generate the zero current signal Szc according to a time point at which an inductor current IL flowing through the inductor L is zero current, so as to control the switched capacitor converter 202 to operate in the BCM or in the DCM. The switching signal generation circuit 2015 is configured to operably generate the switching signals S1~S4 according to the PWM signal Spwm1, the PWM signal Spwm2 and the zero current signal Szc, wherein the switching signals S1~S4 are configured to operably control the switches Q1~Q4 in the switching circuit, respectively.

Figure 3:
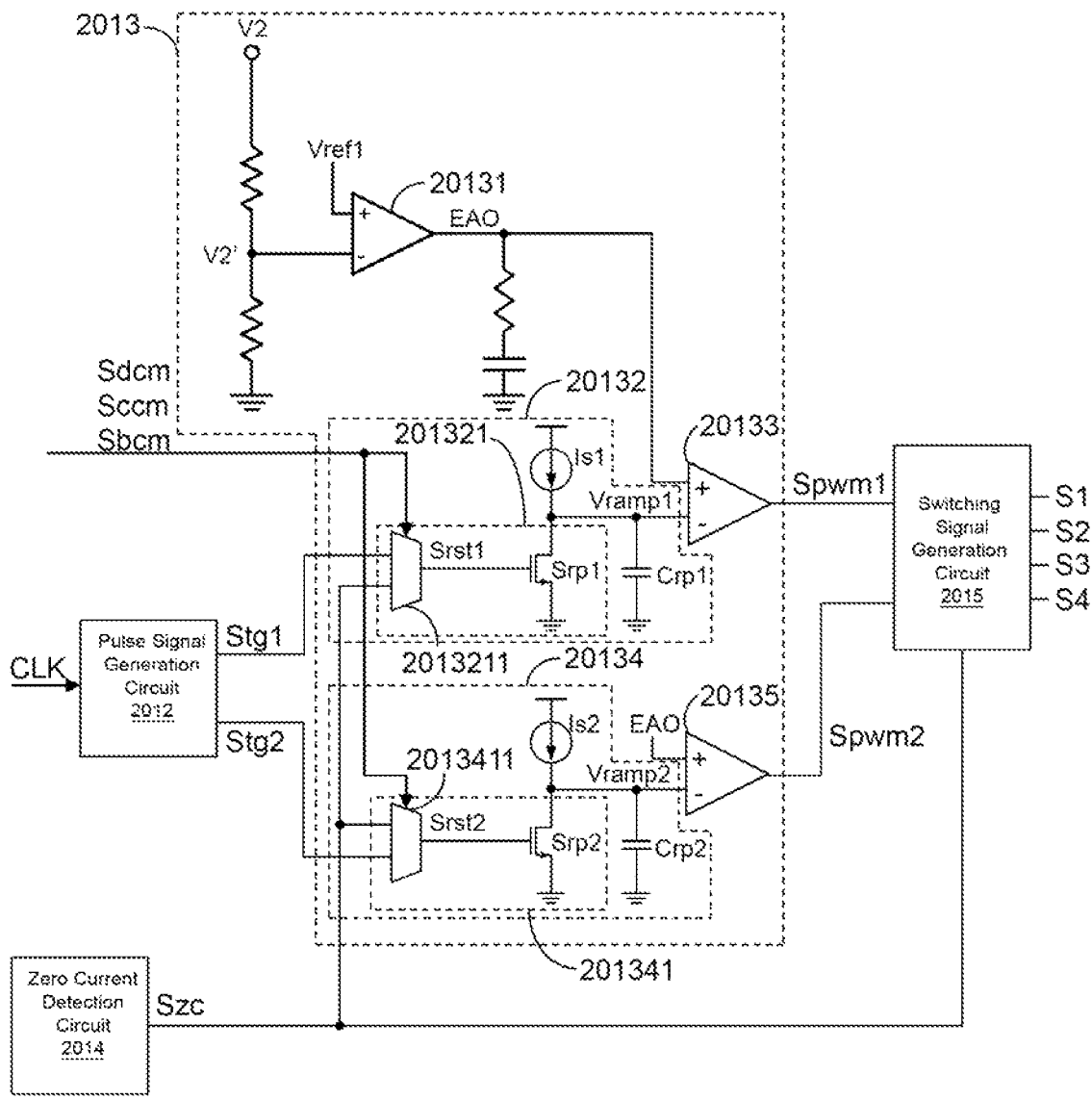
FIG. 3 shows a schematic circuit block diagram of a PWM circuit of a control circuit in a switched capacitor voltage converter circuit according to an embodiment of the present invention.

FIG. 3 shows a schematic circuit block diagram of a PWM circuit of a control circuit in a switched capacitor voltage converter circuit according to an embodiment of the present invention. As shown in FIG. 3, the PWM circuit 2013 includes: a lock-up circuit 20131, a ramp circuit 20132, a comparison circuit 20133, a ramp circuit 20134, a comparison circuit 20135. The lock-up circuit 20131 is configured to operably lock a second voltage related signal V2' which is correlated with the second voltage V2 at a reference voltage Vref1, to generate a voltage locked signal EAO. The ramp circuit 20132 is configured to operably generate a ramp signal Vramp1. In one embodiment, the ramp circuit 20132 includes: a current source Is1 and a capacitor Crp1. The current source Is1 serves to charge the capacitor Crp1, to generate the ramp signal Vramp1. The comparison circuit 20133 is configured to operably compare the voltage locked signal EAO with the ramp signal Vramp1, so as to generate the PWM signal Spwm1. The ramp circuit 20134 is configured to operably generate a ramp signal Vramp2. In one embodiment, the ramp circuit 20134 includes: a current source Is2 and a capacitor Crp2. The current source Is2 serves to charge the capacitor Crp2, to generate the ramp signal Vramp2. The comparison circuit 20135 is configured to operably compare the voltage locked signal EAO with the ramp signal Vramp2, so as to generate the PWM signal Spwm2. The second ramp signal Vramp2 has a first phase-shift and the second ramp signal Vramp2 is phase-shifted relative to the first ramp signal Vramp1.

In one embodiment, the ramp circuit 20132 includes: a reset circuit 201321, which is configured to operably reset the ramp signal Vramp1 in accordance with a reset signal Srst1. In one embodiment, the reset circuit 201321 includes: a multiplexer 2013211 and a switch Srp1. The multiplexer 2013211 is configured to operably select the zero current detection signal Szc or the trigger signal Stg1 generated from a clock signal CLK to function as the reset signal Srst1 according to the boundary conduction signal Sbcm, the discontinuous conduction signal Sdcm and the continuous conduction signal Sccm, so that the switch Srp1 is turned ON for a short period, whereby the level of the ramp signal Vramp1 is pulled down to zero. In one embodiment, in a case when the boundary conduction signal Sbcm is at enable level, the multiplexer 2013211 will select the zero current detection signal Szc to function as the reset signal Srst1. In another embodiment, in a case when the discontinuous conduction signal Sdcm or the continuous conduction signal Sccm is at enable level, the multiplexer 2013211 will select the trigger signal Stg1 generated from the clock signal CLK to function as the reset signal Srst1.

In one embodiment, the ramp circuit 20134 includes: a reset circuit 201341, which is configured to operably reset the ramp signal Vramp2 in accordance with a reset signal Srst2. In one embodiment, the reset circuit 201341 includes: a multiplexer 2013411 and a switch Srp2. The multiplexer 2013411 is configured to operably select the zero current detection signal Szc or the trigger signal Stg2 generated from the clock signal CLK to function as the reset signal Srst2 according to the boundary conduction signal Sbcm, the discontinuous conduction signal Sdcm and the continuous conduction signal Sccm, so that the switch Srp2 is turned ON for a short period, whereby the level of the ramp signal Vramp2 is pulled down to zero. In one embodiment, in a case when the boundary conduction signal Sbcm is at enable level, the multiplexer 2013411 will select the zero current detection signal Szc to function as the reset signal Srst2. In another embodiment, in a case when the discontinuous conduction signal Sdcm or the continuous conduction signal Sccm is at enable level, the multiplexer 2013411 will select the trigger signal Stg2 generated from the clock signal CLK to function as the reset signal Srst2. In one embodiment, the trigger signal Stg2 has a second phase-shift and the trigger signal Stg2 is phase-shifted relative to the trigger signal Stg1. In one embodiment, an amount of the first phase-shift is substantially equal to an amount of the second phase-shift.

Figure 4:
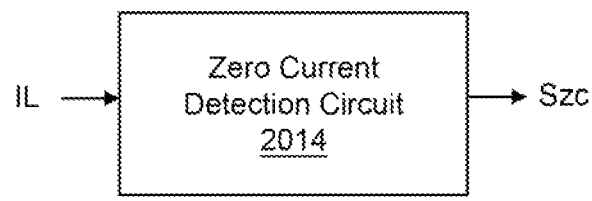
FIG. 4 shows a schematic circuit block diagram of a zero current detection circuit of a control circuit in a switched capacitor voltage converter circuit according to an embodiment of the present invention.
Figure 5:
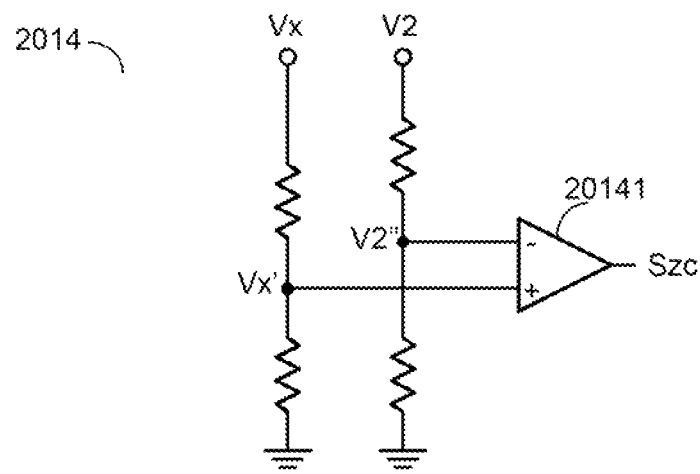
FIG. 5 shows a schematic circuit diagram of a zero current detection circuit of a control circuit in a switched capacitor voltage converter circuit according to an embodiment of the present invention.

FIG. 4 shows a schematic block diagram of a zero current detection circuit of a control circuit in a switched capacitor voltage converter circuit according to an embodiment of the present invention. As shown in FIG. 4, the zero current detection circuit 2014 is configured to operably generate the zero current signal Szc according to an inductor current IL. FIG. 5 shows a schematic circuit diagram of a zero current detection circuit of a control circuit in a switched capacitor voltage converter circuit according to an embodiment of the present invention. This embodiment shown in FIG. 5 is an exemplary embodiment of the zero current detection circuit 2014 in FIG. 4. As shown in FIG. 5, in one embodiment, the zero current detection circuit 2014 includes: a comparator 20141, which is configured to operably compare a second voltage related signal V2" with a switching node voltage related signal Vx' to generate a zero current signal Szc, wherein the second voltage related signal V2" is correlated with the second voltage V2' and the switching node voltage related signal Vx' is correlated with a switching node voltage Vx.

Figure 6:
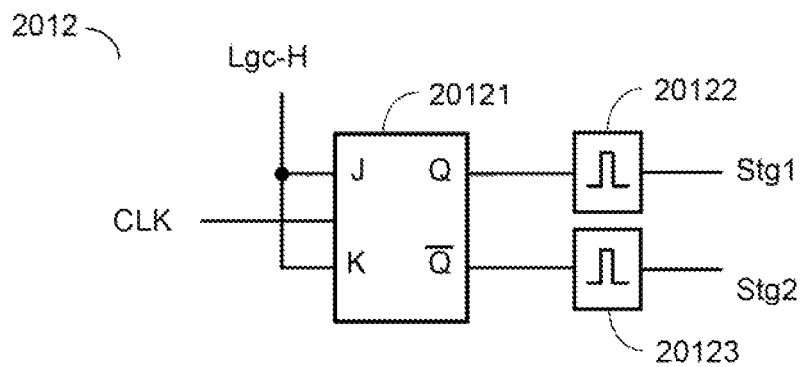
FIG. 6 shows a schematic circuit block diagram of a pulse signal generation circuit according to an embodiment of the present invention.

FIG. 6 shows a schematic circuit block diagram of a pulse signal generation circuit according to an embodiment of the present invention. As shown in FIG. 6, the pulse signal generation circuit 2012 includes, for example but not limited to, a JK flip-flop 20121 and two pulse signal generators 20122 and 20123, wherein the JK flip-flop 20121 serves to generate the trigger signal Stg1 via the pulse signal generator 20122 according to the clock signal CLK and generate the trigger signal Stg2 via the pulse signal generator 20123 according to the clock signal CLK. In this embodiment, because the trigger signals Stg1 and the trigger signal Stg2 are correlated with an output signal of a positive end of the JK flip-flop 20121 and an output signal of a negative end of the JK flip-flop 20121, respectively, the trigger signal Stg1 is phase-shifted relative to the trigger signal Stg2 by 180°.

Figure 7:
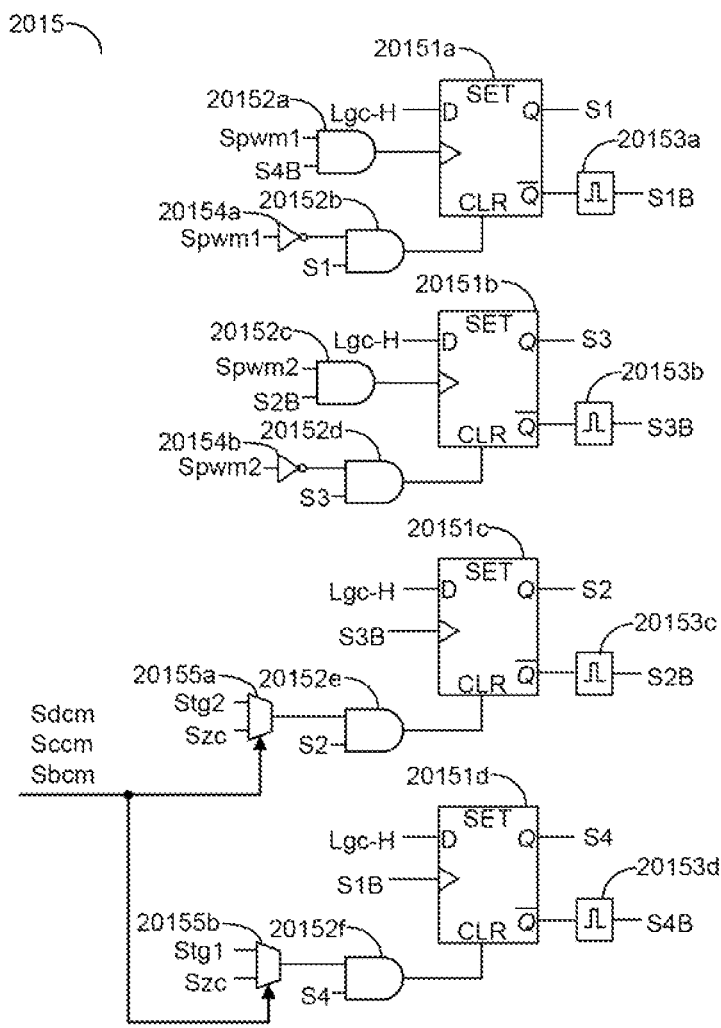
FIG. 7 shows a schematic circuit diagram of a switching signal generation circuit of a control circuit in a switched capacitor voltage converter circuit according to an embodiment of the present invention.

FIG. 7 shows a schematic circuit diagram of a switching signal generation circuit of a control circuit in a switched capacitor voltage converter circuit according to an embodiment of the present invention. As shown in FIG. 7, in one embodiment, the switching signal generation circuit 2015 includes, for example but not limited to, flip-flops 20151a, 20151b, 20151c and 20151d, AND gates 20152a, 20152b, 20152c, 20152d, 20152e and 20152f, pulse generators 20153a, 20153b, 20153c and 20153d, NOT gates 20154a and 20154b and multiplexers 20155a and 20155b. It should be understood that the implementation of the switching signal generation circuit 2015 as shown by FIG. 7 is only an illustrative example, but not for limiting the broadest scope of the present invention. In other embodiments, it is also practicable and within the broadest scope of the present invention that the switching signal generation circuit 2015 can be implemented by any other means.

As shown in FIG. 7, in one embodiment, the flip-flop 20151a generates a switch signal S1 according to an inverting pulse switch signal S4B (i.e., an inverting pulse signal of a switch signal S4) and a PWM signal Spwm1. In a case when the PWM signal Spwm1 is at disable level, the flip-flop 20151a will be reset, to switch the switch signal S1 to disable level. Thereafter, subsequent to a dead time after a time point at which a falling edge of the switch signal S1 occurs, the pulse generator 20153a generates an inverting pulse switch signal S1B, wherein the inverting pulse switch signal S1B serves to generate the switch signal S4. The multiplexer 20155b selects the trigger signal Stg1 or the zero current detection signal Szc to function as an input signal which is inputted into the AND gate 20152f. An AND operation is executed on such input signal and the switch signal S4 by the AND gate 20152f, and the AND operation result is inputted into a reset pin of the flip-flop 20151d. When the trigger signal Stg1 or the zero current detection signal Szc is enabled during a period wherein the switch signal S4 is at enable level, the switch signal S4 is switched to disable level. In response to a falling edge of the switch signal S4 and subsequent to a dead time after a time point at which the falling edge of the switch signal S4 occurs, the pulse generator 20153d generates the inverting pulse switch signal S4B.

Please still refer to FIG. 7. The flip-flop 20151c generates a switch signal S2 according to an inverting pulse switch signal S3B (i.e., an inverting pulse signal of a switch signal S3). The multiplexer 20155a selects the trigger signal Stg2 or the zero current detection signal Szc to function as an input signal which is inputted into the AND gate 20152e. An AND operation is executed on such input signal and the switch signal S2 by the AND gate 20152e, and the AND operation result is inputted into a reset pin of the flip-flop 20151c. When the flip-flop 20151c is reset, the switch signal S2 is switched to disable level. In response to a falling edge of the switch signal S2 and subsequent to a dead time after a time point at which the falling edge of the switch signal S2 occurs, the pulse generator 20153c generates the inverting pulse switch signal S2B, wherein the inverting pulse switch signal S2B serves to generate the switch signal S3.

Please still refer to FIG. 7. The flip-flop 20151b generates a switch signal S3 according to an inverting pulse switch signal S2B (i.e., an inverting pulse signal of a switch signal S2). An AND operation is executed on the switch signal S3 and an inverting signal of the PWM signal Spwm2, and the AND operation result is inputted into a reset pin of the flip-flop 20151b. When the flip-flop 20151b is reset, the switch signal S3 is switched to disable level. In response to a falling edge of the switch signal S3 and subsequent to a dead time after a time point at which the falling edge of the switch signal S3 occurs, the pulse generator 20153b generates the inverting pulse switch signal S3B, wherein the inverting pulse switch signal S3B serves to generate the switch signal S2.

Please still refer to FIG. 7. The flip-flop 20151d generates a switch signal S4 according to an inverting pulse switch signal S1B (i.e., an inverting pulse signal of a switch signal S1). The multiplexer 20155b selects the trigger signal Stg1 or the zero current detection signal Szc to function as an input signal which is inputted into the AND gate 20152f. An AND operation is executed on such input signal and the switch signal S4 by the AND gate 20152f, and the AND operation result is inputted into a reset pin of the flip-flop 20151d. When the flip-flop 20151d is reset, the switch signal S4 is switched to disable level. In response to a falling edge of the switch signal S4 and subsequent to a dead time after a time point at which the falling edge of the switch signal S4 occurs, the pulse generator 20153d generates the inverting pulse switch signal S4B, wherein the inverting pulse switch signal S4B serves to generate the switch signal S1.

The pulse generators 20153a, 20153b, 20153c and 20153d serve to produce dead times, so as to prolong OFF periods of the switching signal S1~S4 in light load condition, thereby saving power.

FIG. 8 to FIG. 13 illustrate signal waveform diagrams according to several embodiments of the present invention, wherein a switched capacitor voltage converter circuit of FIG. 2A operates by adopting a pulse signal generation circuit of FIG. 3. The clock signal CLK, the trigger signal Stg1, the trigger signal Stg2, the ramp signal Vramp1, the ramp signal Vramp2, the PWM signal Spwm1, the PWM signal Spwm2, switching signal S1~S4, the zero current detection signal Szc, the inductor current IL and the switching period Tsw are as shown in FIG. 8 to FIG. 13.

Figure 8:
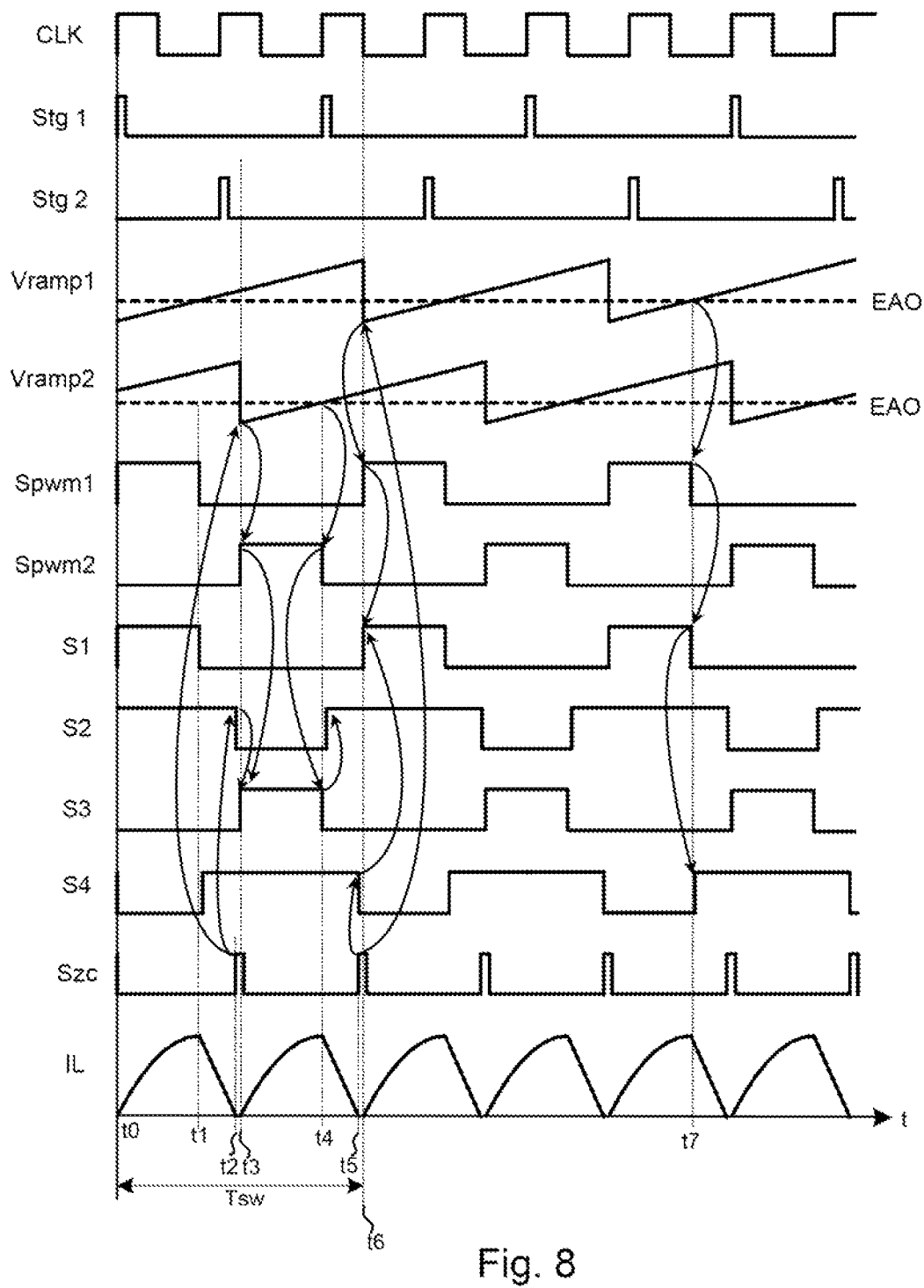
FIG. 8 to FIG. 13 illustrate signal waveform diagrams according to several embodiments of the present invention, wherein a switched capacitor voltage converter circuit of FIG. 2A operates by adopting a pulse signal generation circuit of FIG. 3.

Please refer to FIG. 8 in conjunction with FIG. 3. This embodiment of FIG. 8 depicts a scenario wherein the switched capacitor converter 202 operates in a BCM, wherein a duty ratio of the switched capacitor converter 202 is smaller than 50% (whereby the first voltage V1 is greater than 2-fold of the second voltage V2). At the time point t2, the zero current detection signal Szc triggers the ramp signal Vramp2 to be reset by the reset signal Srst2, whereby the PWM signal Spwm2 is switched to disable level. Besides, at the time point t2, the zero current detection signal Szc also triggers the switching signal S2 to switch to disable level, so that the switching signal S3 is switched to enable level. At the time point t4, because the ramp signal Vramp2 is greater than the voltage locked signal EAO, the PWM signal Spwm2 is switched to disable level, so that the switching signal S3 is switched to disable level, whereby the switching signal S2 is switched to enable level. At the time point t5, the zero current detection signal Szc triggers the switching signal S4 to switch to disable level. In addition, at the time point t5, the zero current detection signal Szc also triggers the ramp signal Vramp1 to be reset by the reset signal Srst1, whereby the PWM signal Spwm1 is switched to enable level, thus controlling the switching signal S1 to switch to enable level. At the time point t7, because the ramp signal Vramp1 is greater than the voltage locked signal EAO, the PWM signal Spwm1 is switched to disable level, so that the switching signal S1 is switched to disable level, whereby the switching signal S4 is switched to enable level. As shown in FIG. 8, the switching signals S1~S4 are adjusted according to the PWM signal Spwm1 and the PWM signal Spwm2, so as to regulate the second voltage V2. In one embodiment, the switching signal S1 is adjusted according to the PWM signal Spwm1, whereas, the switching signal S2 is adjusted according to the PWM signal Spwm2.

As shown in FIG. 8, in one embodiment, in the BCM, a time point at which the switching signals S1~S4 are switched to enable level is determined by a zero current detection signal Szc or is determined by (1) or (2) below: (1) the ramp signal Vramp1 and the voltage locked signal EAO or (2) the ramp signal Vramp2 and the voltage locked signal EAO. On the other hand, in the BCM, a time point at which the switching signals S1~S4 are switched to disable level is determined by the zero current detection signal Szc or is determined by (1) or (2) below: (1) the ramp signal Vramp1 and the voltage locked signal EAO or (2) the ramp signal Vramp2 and the voltage locked signal EAO.

To summarize all of the foregoing, in the embodiment shown in FIG. 8, the control circuit 201 turns ON the switch Q1 and the switch Q2 according to the PWM signal Spwm1 and the PWM signal Spwm2 during the period from the time point t0 to the time point t1, thus generating the inductor current IL. During the period from the time point t1 to the time point t2, the inductor current IL flows through the switch Q2 and the switch Q4, and the inductor current IL is gradually decreased until the inductor current IL reaches zero. Once the inductor current IL reaches zero at the time point t2, the zero current detection signal Szc is triggered. As a result, the PWM signal Spwm2 is reset and the ramp signal Vramp2 begins to rise. During the period from the time point t3 to the time point t4, the switch Q3 and the switch Q4 are turned ON, so that the inductor L charges the output capacitor Co via the switch Q3 and the switch Q4. During the period from the time point t4 to the time point t5, the inductor current IL flows through the switch Q2 and the switch Q4, and the inductor current IL is gradually decreased until the inductor current IL reaches zero. Once the inductor current IL reaches zero at the time point t5, the ramp signal Vramp1 is triggered, so that a following switching period Tsw is initiated. It should be explained that the language "the PWM signal Spwm2 is reset" means that the PWM signal Spwm2 is switched from disable level to enable level, for example being triggered by the zero current detection signal Szc.

Figure 9:
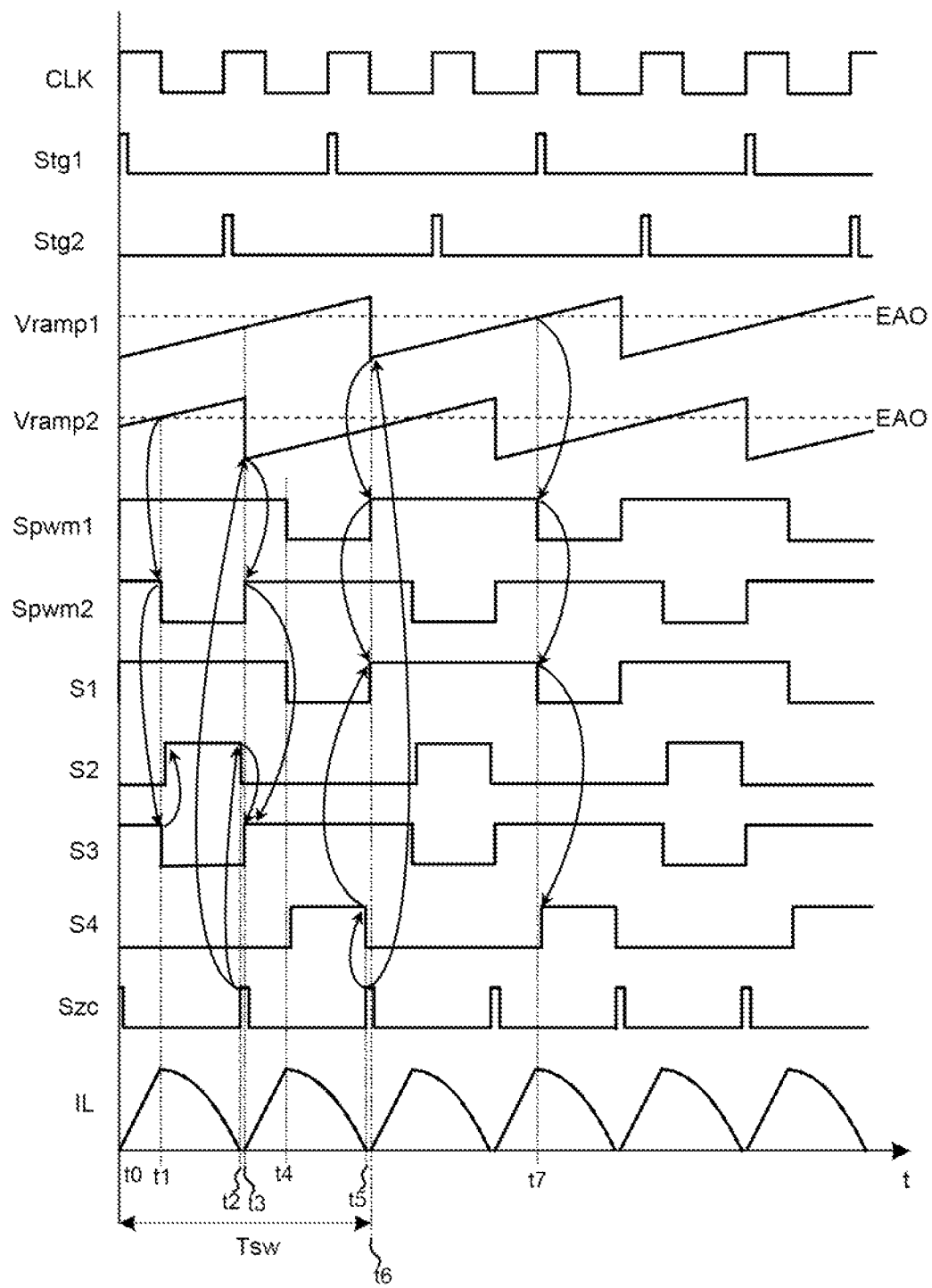

Please refer to FIG. 9 in conjunction with FIG. 3. This embodiment of FIG. 9 depicts a scenario wherein the switched capacitor converter 202 operates in a BCM, wherein a duty ratio of the switched capacitor converter 202 is greater than 50% (whereby the first voltage V1 is smaller than 2-fold of the second voltage V2). At the time point t1, because the ramp signal Vramp2 is greater than the voltage locked signal EAO, the PWM signal Spwm2 is switched to disable level, so that the switching signal S3 is switched to disable level, whereby the switching signal S2 is switched to enable level. At the time point t2, the zero current detection signal Szc triggers the ramp signal Vramp2 to be reset by the reset signal Srst2, whereby the PWM signal Spwm2 is switched to enable level. Besides, at the time point t2, the zero current detection signal Szc also triggers the switching signal S2 to switch to disable level, so that the switching signal S3 is switched to enable level. At the time point t5, the zero current detection signal Szc triggers the switching signal S4 to switch to disable level. In addition, at the time point t5, the zero current detection signal Szc also triggers the ramp signal Vramp1 to be reset by the reset signal Srst1, whereby the PWM signal Spwm1 is switched to enable level, thus controlling the switching signal S1 to switch to enable level. At the time point t7, because the ramp signal Vramp1 is greater than the voltage locked signal EAO, the PWM signal Spwm1 is switched to disable level, so that the switching signal S1 is switched to disable level, whereby the switching signal S4 is switched to enable level.

To summarize all of the foregoing, in the embodiment shown in FIG. 9, the control circuit 201 turns ON the switch Q1 and the switch Q3 according to the PWM signal Spwm1 and the PWM signal Spwm2 during the period from the time point t0 to the time point t1, thus generating the inductor current IL. During the period from the time point t1 to the time point t2, the inductor current IL flows through the switch Q1 and the switch Q2 and the inductor current IL is gradually decreased until the inductor current IL reaches zero. Once the inductor current IL reaches zero at the time point t2, the zero current detection signal Szc is triggered. As a result, the PWM signal Spwm2 is reset and the ramp signal Vramp2 begins to rise. The control circuit 201 turns ON the switch Q1 and the switch Q3 according to the PWM signal Spwm1 and the PWM signal Spwm2 during the period from the time point t3 to the time point t4, so that the switch Q1 and the switch Q3 charge the output capacitor Co via the inductor L. During the period from the time point t4 to the time point t5, the inductor current IL flows through the switch Q3 and the switch Q4, and the inductor current IL is gradually decreased until the inductor current IL reaches zero. Once the inductor current IL reaches zero at the time point t5, the ramp signal Vramp1 is triggered, so that a following switching period Tsw is initiated.

Figure 10:
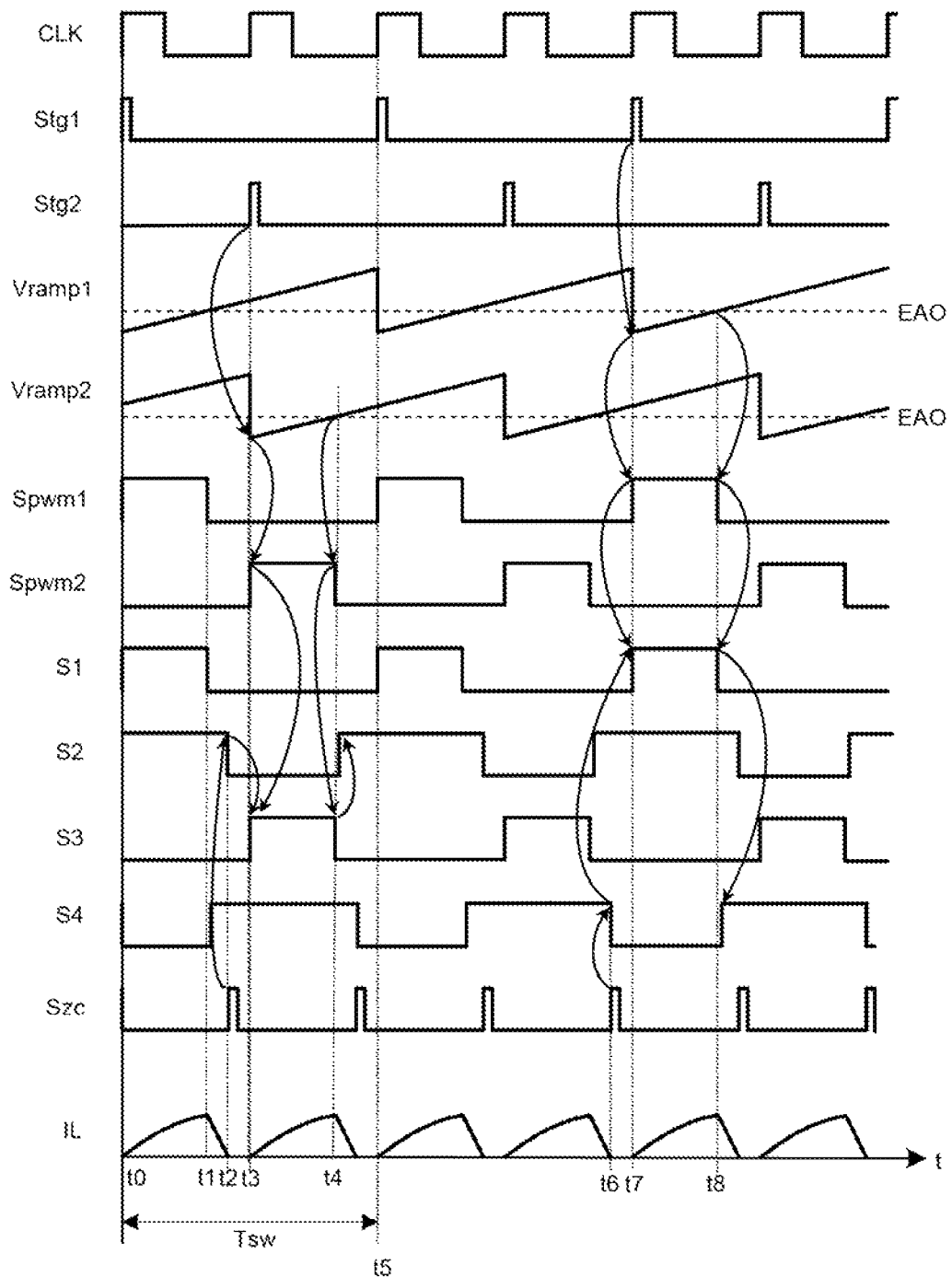

Please refer to FIG. 10 in conjunction with FIG. 3. This embodiment of FIG. 10 depicts a scenario wherein the switched capacitor converter 202 operates in a DCM, wherein a duty ratio of the switched capacitor converter 202 is smaller than 50% (whereby the first voltage V1 is greater than 2-fold of the second voltage V2). At the time point t2, the zero current detection signal Szc triggers the switching signal S2 to switch to disable level. At the time point t3, the trigger signal Stg2 triggers the ramp signal Vramp2 to be reset by the reset signal Srst2, whereby the PWM signal Spwm2 is switched to enable level. As a result, at the time point t3, because the switching signal S2 remains at disable level, the switching signal S3 is switched to enable level. At the time point t4, because the ramp signal Vramp2 is greater than the voltage locked signal EAO, the PWM signal Spwm2 is switched to disable level, so that the switching signal S3 is switched to disable level, whereby the switching signal S2 is switched to enable level. At the time point t6, the zero current detection signal Szc triggers the switching signal S4 to switch to disable level. At the time point t7, the trigger signal Stg1 triggers the ramp signal Vramp1 to be reset by the reset signal Srst1, whereby the PWM signal Spwm1 is switched to enable level. At the time point t7, because the switching signal S4 remains at disable level, the switching signal S1 is switched to enable level. At the time point t8, because the ramp signal Vramp1 is greater than the voltage locked signal EAO, the PWM signal Spwm1 is switched to disable level, so that the switching signal S1 is switched to disable level, whereby the switching signal S4 is switched to enable level.

As shown in FIG. 10, in one embodiment, in the DCM, a time point at which the switching signals S1~S4 are switched to enable level is determined by a clock signal CLK or is determined by (1) or (2) below: (1) the ramp signal Vramp1 and the voltage locked signal EAO or (2) the ramp signal Vramp2 and the voltage locked signal EAO. On the other hand, in the DCM, a time point at which the switching signals S1~S4 are switched to disable level is determined by the zero current detection signal Szc or is determined by (1) or (2) below: (1) the ramp signal Vramp1 and the voltage locked signal EAO or (2) the ramp signal Vramp2 and the voltage locked signal EAO.

To summarize all of the foregoing, in the embodiment shown in FIG. 10, the control circuit 201 turns ON the switch Q1 and the switch Q2 according to the PWM signal Spwm1 and the PWM signal Spwm2 during the period from the time point t0 to the time point t1, thus generating the inductor current IL. During the period from the time point t1 to the time point t2, the inductor current IL flows through the switch Q2 and the switch Q4, and the inductor current IL is gradually decreased until the inductor current IL reaches zero. Once the inductor current IL reaches zero at the time point t2, the zero current detection signal Szc is triggered, whereby the switch Q2 is turned OFF. At the time point t3, when the PWM circuit 2013 once again generates a pulse according to the trigger signal Stg2, the PWM signal Spwm2 is switched to enable level and the ramp signal Vramp2 will begin to rise. During the period from the time point t3 to the time point t4, the control circuit 201 turns ON the switch Q3 and the switch Q4 according to the PWM signal Spwm1 and the PWM signal Spwm2, so that the inductor L charges the output capacitor Co via the switch Q3 and the switch Q4. During the period from the time point t4 to the time point t5, the inductor current IL flows through the switch Q2 and the switch Q4, and the inductor current IL is gradually decreased until the inductor current IL reaches zero. Once the inductor current IL reaches zero, the switch Q4 is turned OFF. At the time point t5, when the PWM circuit 2013 once again generates a pulse according to the trigger signal Stg1, the ramp signal Vramp1 is triggered, so that a following switching period Tsw is initiated.

Figure 11:
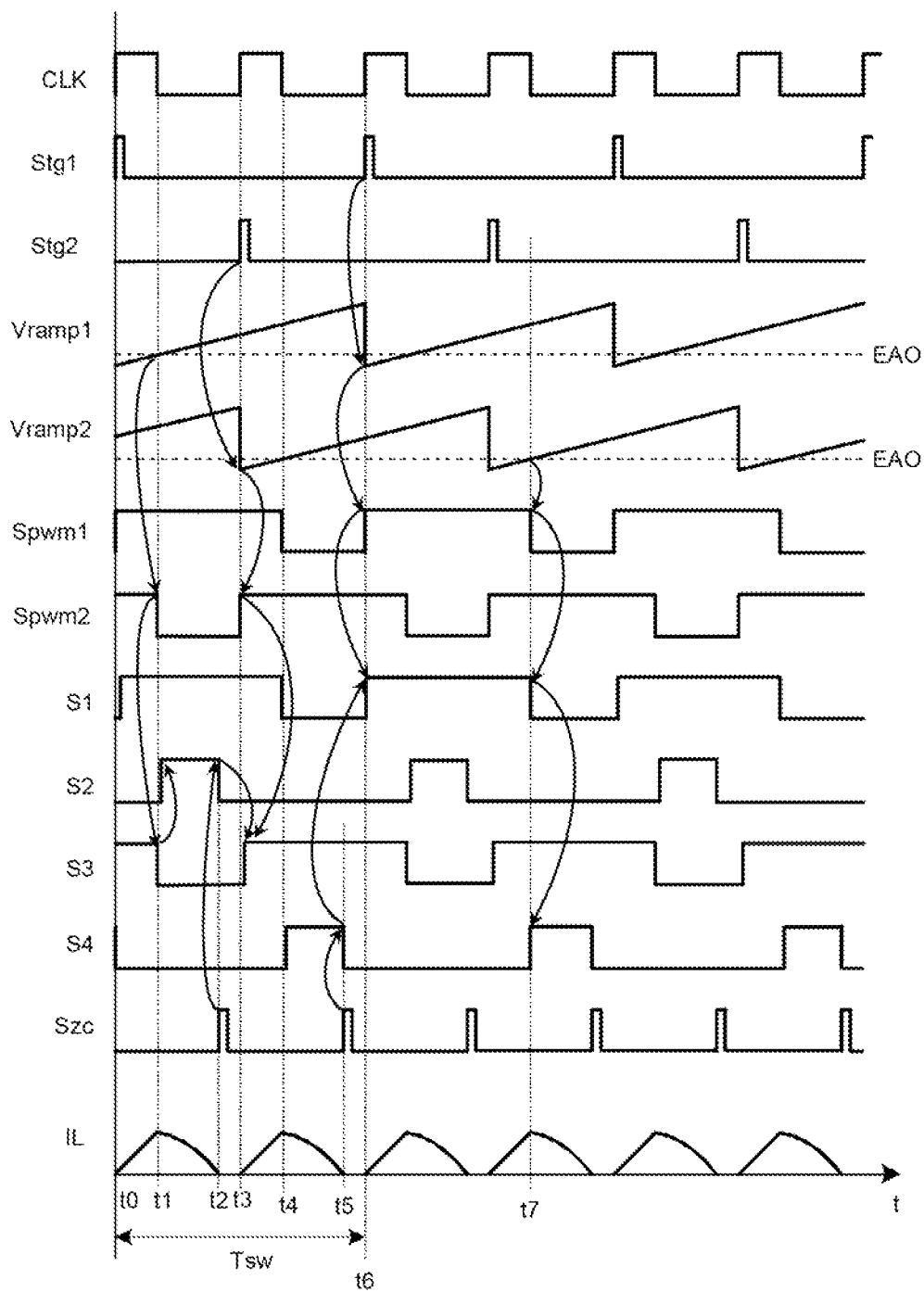

Please refer to FIG. 11. This embodiment of FIG. 11 depicts a scenario wherein the switched capacitor converter 202 operates in a DCM, wherein a duty ratio of the switched capacitor converter 202 is greater than 50% (whereby the first voltage V1 is smaller than 2-fold of the second voltage V2). At the time point t1, because the ramp signal Vramp1 is greater than the voltage locked signal EAO, the PWM signal Spwm1 is switched to disable level, so that the switching signal S3 is switched to disable level, whereby the switching signal S2 is switched to enable level. At the time point t2, the zero current detection signal Szc triggers the switching signal S2 to switch to disable level. At the time point t3, the trigger signal Stg2 triggers the ramp signal Vramp2 to be reset by the reset signal Srst2, whereby the PWM signal Spwm2 is switched to enable level. At the time point t3, because the switching signal S2 remains at disable level, the switching signal S3 is switched to enable level. At the time point t5, the zero current detection signal Szc triggers the switching signal S4 to switch to disable level. At the time point t6, the trigger signal Stg1 triggers the ramp signal Vramp1 to be reset by the reset signal Srst1, whereby the PWM signal Spwm1 is switched to enable level. At the time point t6, because the switching signal S4 remains at disable level, the switching signal S1 is switched to enable level. At the time point t7, because the ramp signal Vramp1 is greater than the voltage locked signal EAO, the PWM signal Spwm2 is switched to disable level, so that the switching signal S1 is switched to disable level, whereby the switching signal S4 is switched to enable level.

To summarize all of the foregoing, in the embodiment shown in FIG. 11, the control circuit 21 turns ON the switch Q1 and the switch Q3 according to the PWM signal Spwm1 and the PWM signal Spwm2 during the period from the time point t0 to the time point t1, thus generating the inductor current IL. During the period from the time point t1 to the time point t2, the inductor current IL flows through the switch Q1 and the switch Q2, and the inductor current IL is gradually decreased until the inductor current IL reaches zero. Once the inductor current IL reaches zero at the time point t2, the zero current detection signal Szc is triggered, whereby the switch Q2 is turned OFF. At the time point t3, when the PWM circuit 2013 once again generates a pulse according to the trigger signal Stg2, the PWM signal Spwm2 is switched to enable level and the ramp signal Vramp2 will begin to rise. During the period from the time point t3 to the time point t4, the control circuit 201 turns ON the switch Q1 and the switch Q3 according to the PWM signal Spwm1 and the PWM signal Spwm2, so that the inductor L charges the output capacitor Co via the switch Q1 and the switch Q3. During the period from the time point t4 to the time point t5, the inductor current IL flows through the switch Q3 and the switch Q4, and the inductor current IL is gradually decreased until the inductor current IL reaches zero. At the time point t5, once the inductor current IL reaches zero, the switch Q4 is turned OFF. At the time point t6, when the PWM circuit 2013 once again generates a pulse according to the trigger signal Stg1, the ramp signal Vramp1 is triggered, so that a following switching period Tsw is initiated.

Figure 12:
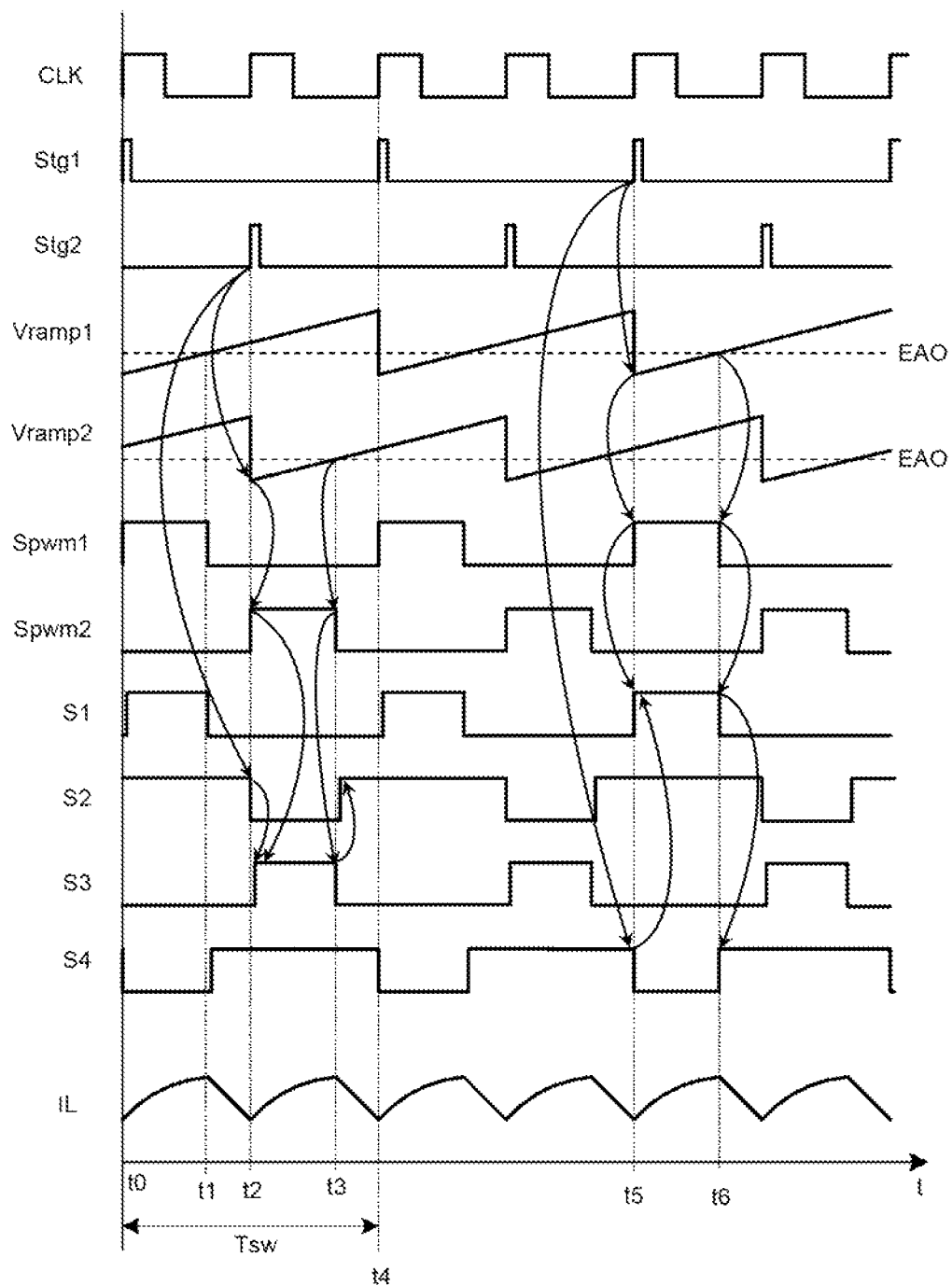

Please refer to FIG. 12 along with FIG. 3. This embodiment of FIG. 12 depicts a scenario wherein the switched capacitor converter 202 operates in a CCM, wherein a duty ratio of the switched capacitor converter 202 is smaller than 50% (whereby the first voltage V1 is greater than 2-fold of the second voltage V2). At the time point t2, the trigger signal Stg2 triggers the switching signal S2 to switch to disable level. Besides, at the time point t2, the trigger signal Stg2 also triggers the ramp signal Vramp2 to be reset by the reset signal Srst2, whereby the PWM signal Spwm2 is switched to enable level, to thereby switch the switching signal S3 to enable level. At the time point t3, because the ramp signal Vramp2 is greater than the voltage locked signal EAO, the PWM signal Spwm2 is switched to disable level, so that the switching signal S3 is switched to disable level, whereby the switching signal S2 is switched to enable level. At the time point t5, the trigger signal Stg1 triggers the switching signal S4 to switch to disable level. Besides, at the time point t5, the trigger signal Stg1 also triggers the ramp signal Vramp1 to be reset by the reset signal Srst1, whereby the PWM signal Spwm1 is switched to enable level, to thereby switch the switching signal S1 to enable level. At the time point t6, because the ramp signal Vramp1 is greater than the voltage locked signal EAO, the PWM signal Spwm1 is switched to disable level, so that the switching signal S1 is switched to disable level, whereby the switching signal S4 is switched to enable level.

As shown in FIG. 12, in one embodiment, in the CCM, a time point at which the switching signals S1~S4 are switched to enable level is determined by a clock signal CLK or is determined by (1) or (2) below: (1) the ramp signal Vramp1 and the voltage locked signal EAO or (2) the ramp signal Vramp2 and the voltage locked signal EAO. On the other hand, in the CCM, a time point at which the switching signals S1~S4 are switched to disable level is determined by the clock signal CLK or is determined by (1) or (2) below: (1) the ramp signal Vramp1 and the voltage locked signal EAO or (2) the ramp signal Vramp2 and the voltage locked signal EAO.

To summarize all of the foregoing, in the embodiment shown in FIG. 12, the control circuit 21 turns ON the switch Q1 and the switch Q2 according to the PWM signal Spwm1 and the PWM signal Spwm2 during the period from the time point t0 to the time point t1, thus generating the inductor current IL flowing through the flying capacitor C1. During the period from the time point t1 to the time point t2, although the inductor current IL flows through the switch Q2 and the switch Q4 and the inductor current IL is gradually decreased, the inductor current IL remains higher than zero. During the period from the time point t2 to the time point t3, the control circuit 201 turns ON the switch Q3 and the switch Q4 according to the PWM signal Spwm2 and the PWM signal Spwm1, so that the inductor L charges the output capacitor Co via the switch Q3 and the switch Q4. During the period from the time point t3 to the time point t4, although the inductor current IL flows through the switch Q2 and the switch Q4 and the inductor current IL is gradually decreased, the inductor current IL remains higher than zero. The period from the time point t0 to the time point t4 is defined as a switching period Tsw.

Figure 13:
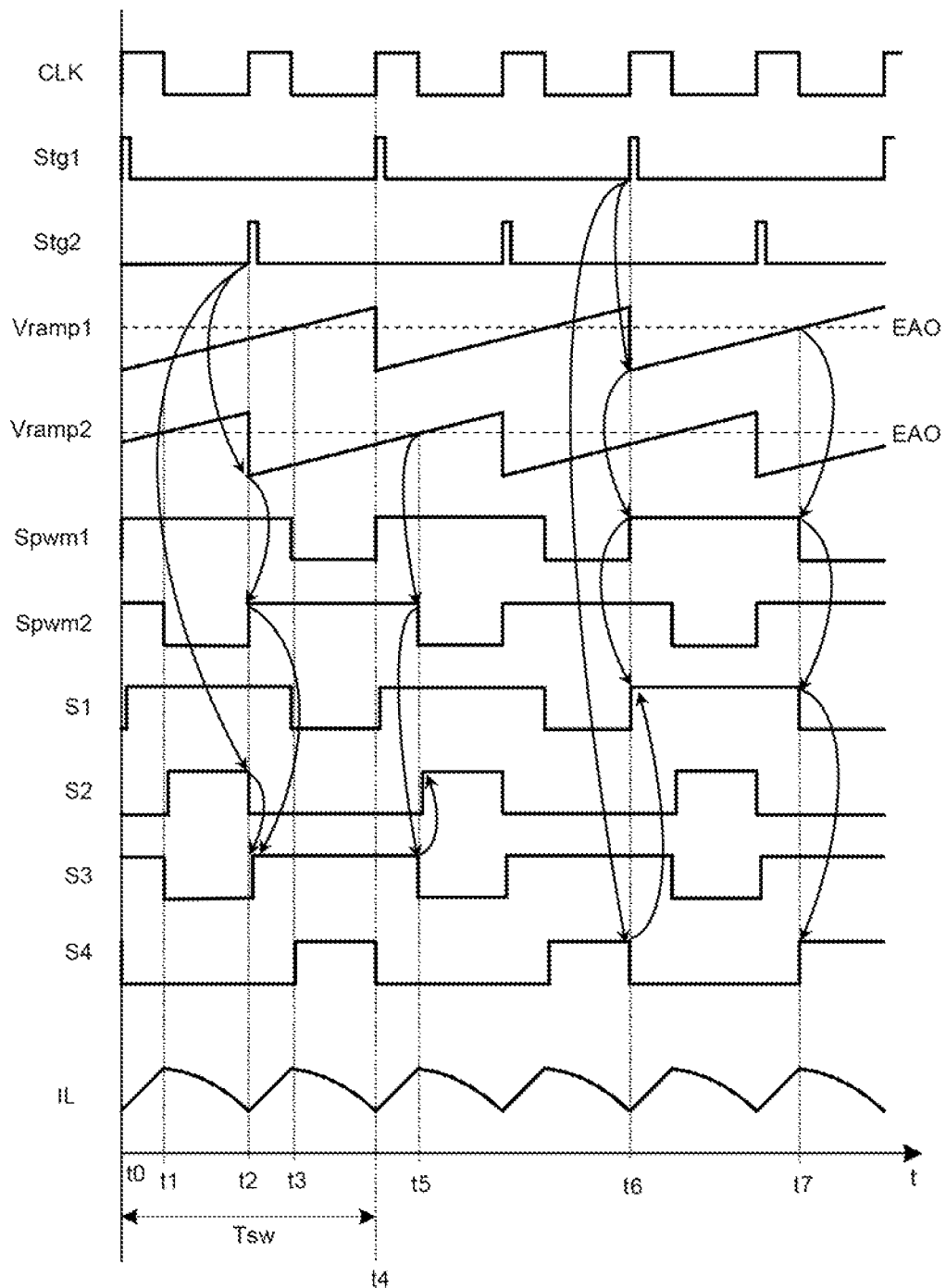

Please refer to FIG. 13 along with FIG. 3. This embodiment of FIG. 13 depicts a scenario wherein the switched capacitor converter 202 operates in a CCM, wherein a duty ratio of the switched capacitor converter 202 is greater than 50% (whereby the first voltage V1 is smaller than 2-fold of the second voltage V2). At the time point t2, the trigger signal Stg2 triggers the switching signal S2 to switch to disable level. Besides, at the time point t2, the trigger signal Stg2 also triggers the ramp signal Vramp2 to be reset by the reset signal Srst2, whereby the PWM signal Spwm2 is switched to enable level. As a result, at the time point t2, the switching signal S3 is switched to enable level. At the time point t5, because the ramp signal Vramp2 is greater than the voltage locked signal EAO, the PWM signal Spwm2 is switched to disable level, so that the switching signal S3 is switched to disable level, whereby the switching signal S2 is switched to enable level. At the time point t6, the trigger signal Stg1 triggers the switching signal S4 to switch to disable level. Besides, at the time point t6, the trigger signal Stg1 also triggers the ramp signal Vramp1 to be reset by the reset signal Srst1, whereby the PWM signal Spwm1 is switched to enable level. As a result, at the time point t6, the switching signal S1 is switched to enable level. At the time point t7, because the ramp signal Vramp1 is greater than the voltage locked signal EAO, the PWM signal Spwm1 is switched to disable level, so that the switching signal S1 is switched to disable level, whereby the switching signal S4 is switched to enable level.

To summarize all of the foregoing, in the embodiment shown in FIG. 13, the control circuit 21 turns ON the switch Q1 and the switch Q3 according to the PWM signal Spwm1 and the PWM signal Spwm2 during the period from the time point t0 to the time point t1, thus generating the inductor current IL. During the period from the time point t1 to the time point t2, the inductor current IL flows through the switch Q1 and the switch Q2 and the inductor current IL flows through the flying capacitor C1, so that the flying capacitor C1 and the output capacitor Co are charged by the inductor current IL. During the period from the time point t2 to the time point t3, the control circuit 201 turns ON the switch Q1 and the switch Q3 according to the PWM signal Spwm1 and the PWM signal Spwm2, so that the inductor L charges the output capacitor Co via the switch Q1 and the switch Q3. During the period from the time point t3 to the time point t4, the inductor current IL flows through the switch Q3 and the switch Q4, so that the inductor L charges the output capacitor Co via the switch Q3 and the switch Q4. As a result, although the inductor current IL is gradually decreased, the inductor current IL remains higher than zero. The period from the time point t0 to the time point t4 is defined as a switching period Tsw.

FIG. 14 to FIG. 19 illustrate signal waveform diagrams according to several embodiments of the present invention, wherein the switched capacitor voltage converter circuit of FIG. 2A operates by adopting a pulse signal generation circuit of FIG. 3. The first voltage V1, the second voltage V2, the output current I2, the voltage across the capacitor VC1, the switching node voltage Vx and the inductor current IL are as shown in FIG. 14 to FIG. 19.

Figure 14:
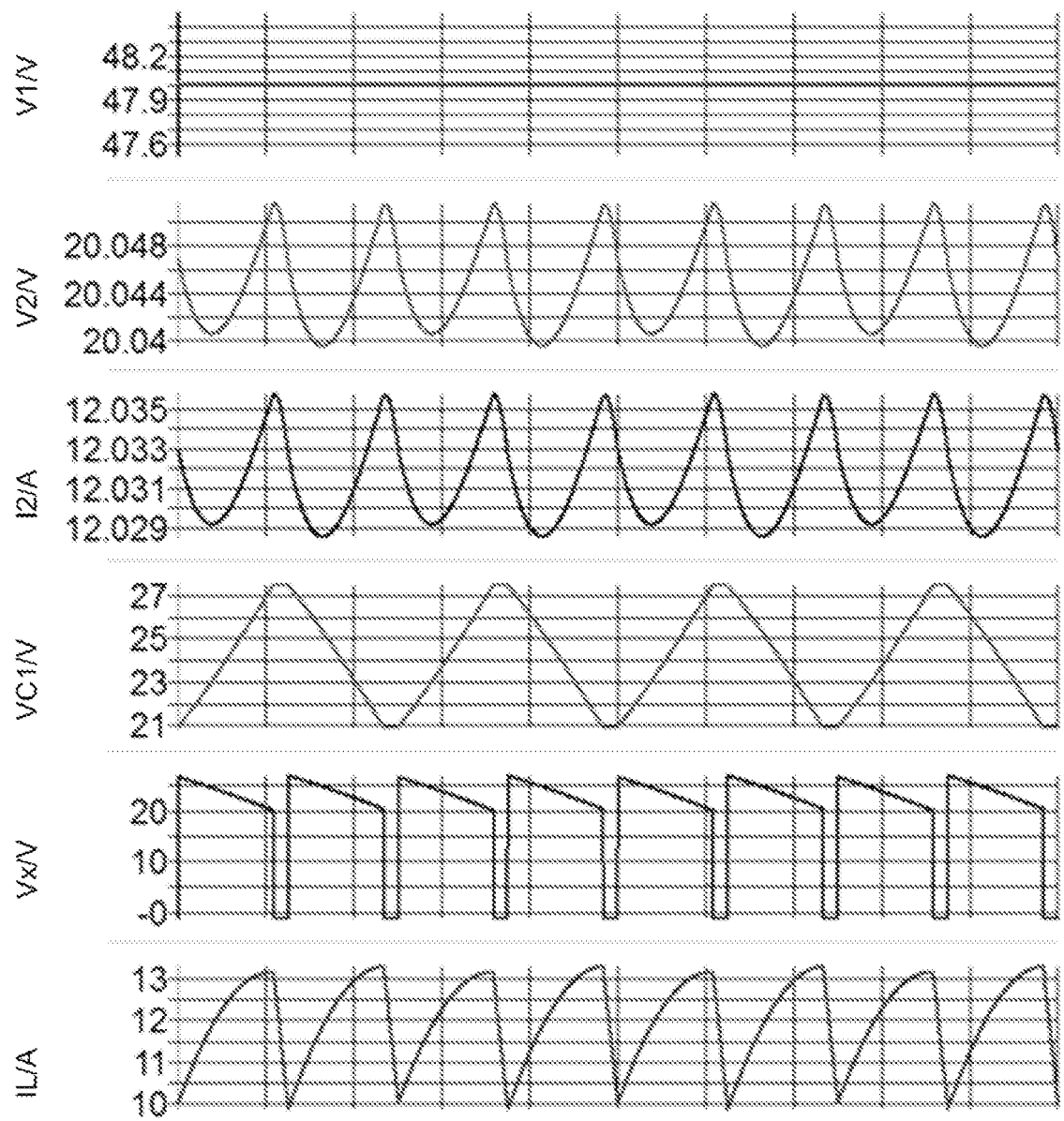
FIG. 14 to FIG. 19 illustrate signal waveform diagrams according to several embodiments of the present invention, wherein a switched capacitor voltage converter circuit of FIG. 2A operates by adopting a pulse signal generation circuit of FIG. 3.
Figure 15:
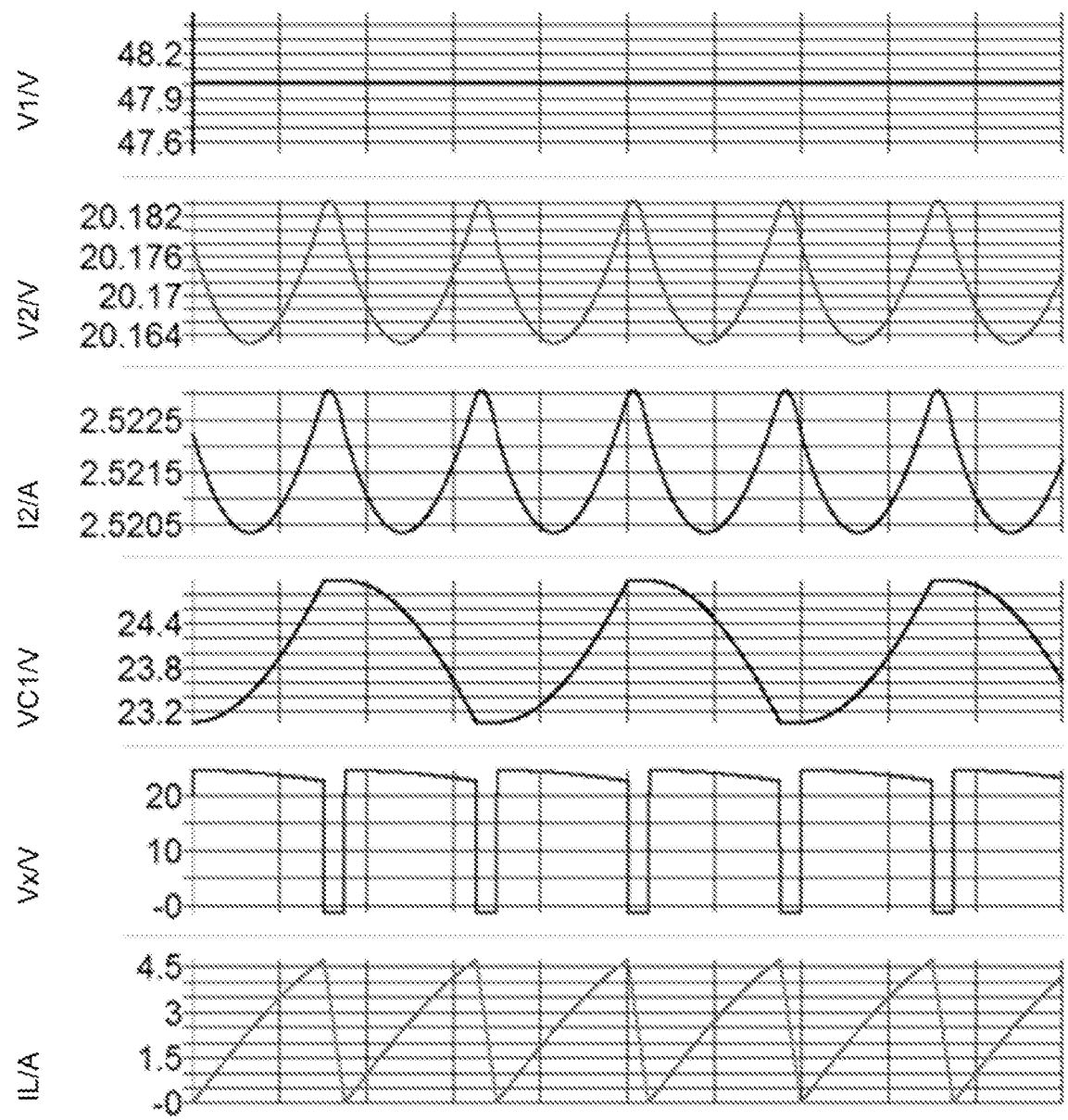
Figure 16:
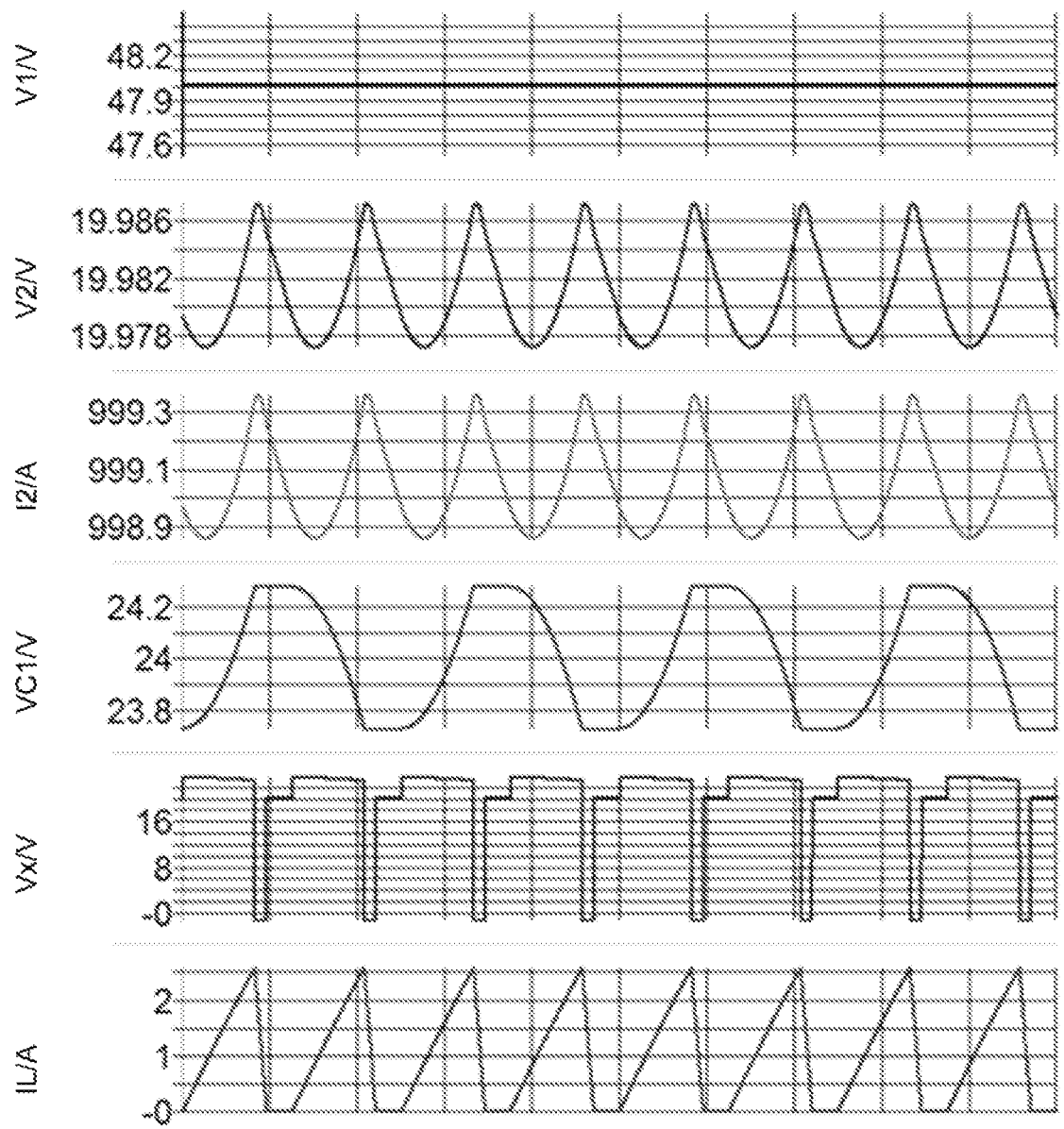

FIG. 14 illustrates a signal waveform diagram depicting a scenario wherein the switched capacitor converter 202 of FIG. 2A operates in a CCM, wherein a duty ratio of the switched capacitor converter 202 of FIG. 2A is smaller than 50%. FIG. 15 illustrates a signal waveform diagram depicting a scenario wherein the switched capacitor converter 202 of FIG. 2A operates in a BCM, wherein a duty ratio of the switched capacitor converter 202 of FIG. 2A is smaller than 50%. FIG. 16 illustrates a signal waveform diagram depicting a scenario wherein the switched capacitor converter 202 of FIG. 2A operates in a DCM, wherein a duty ratio of the switched capacitor converter 202 of FIG. 2A is smaller than 50%.

Figure 17:
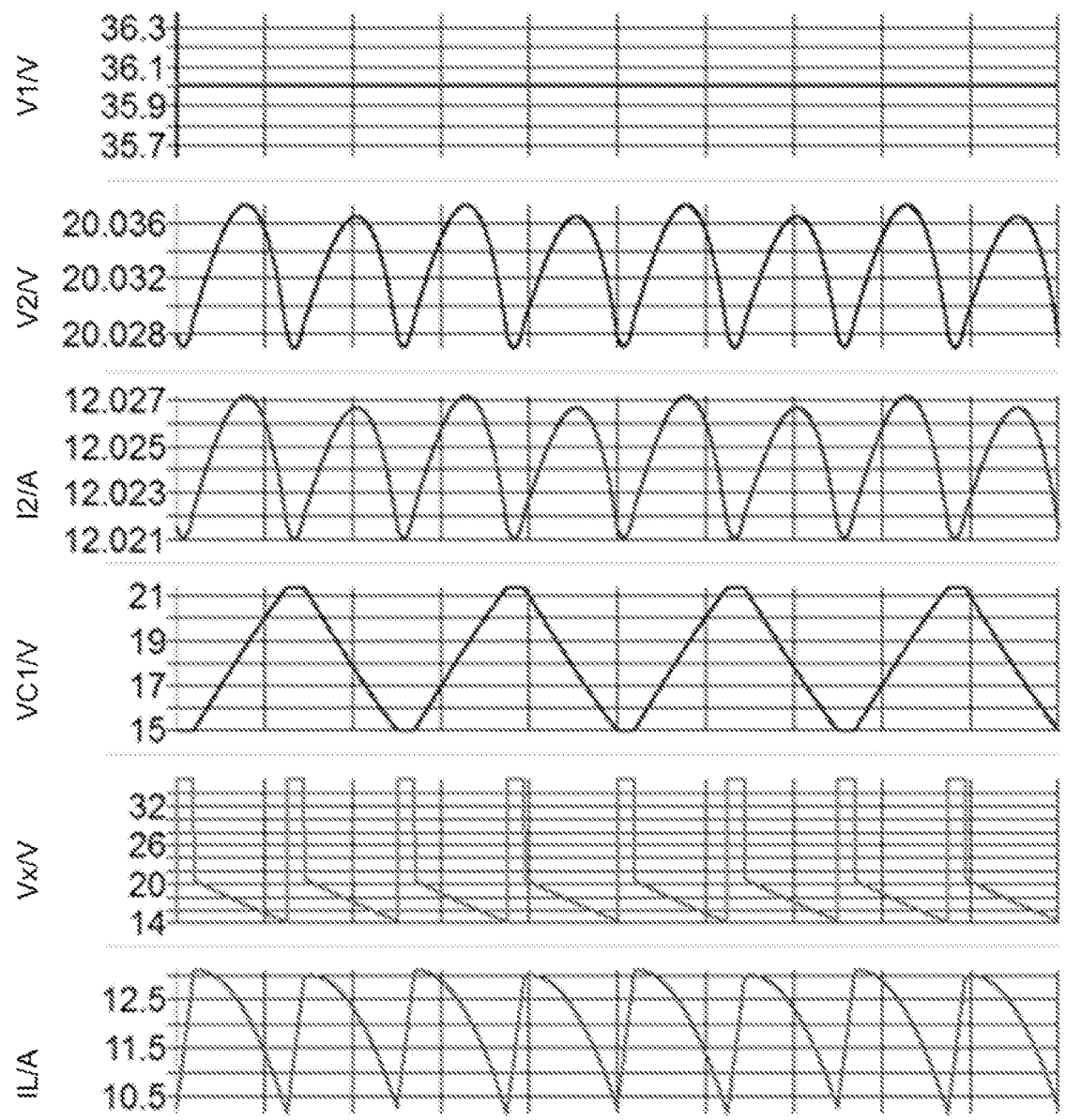
Figure 18:
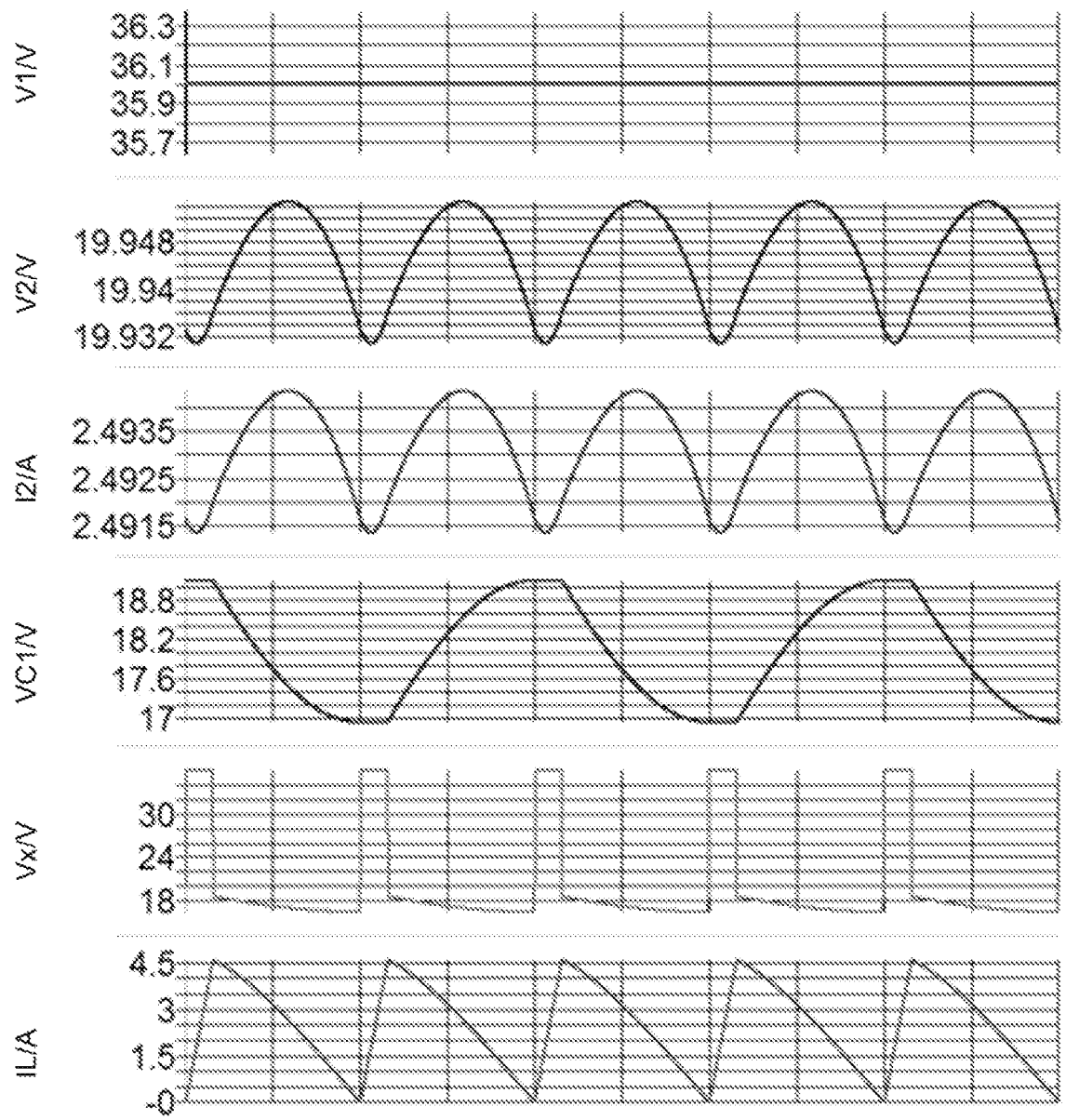
Figure 19:
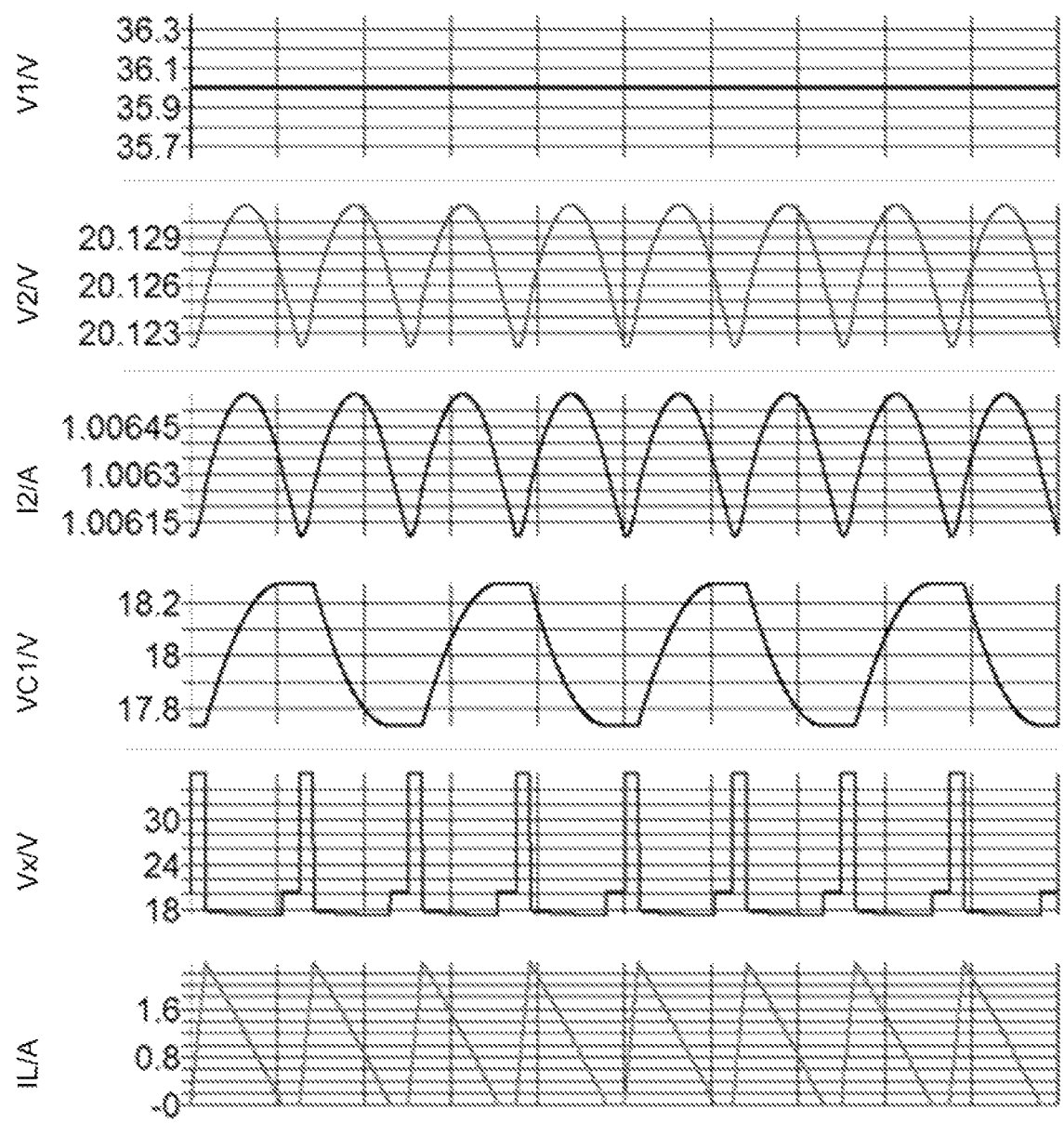

FIG. 17 illustrates a signal waveform diagram depicting a scenario wherein the switched capacitor converter 202 of FIG. 2A operates in a CCM, wherein a duty ratio of the switched capacitor converter 202 of FIG. 2A is greater than 50%. FIG. 18 illustrates a signal waveform diagram depicting a scenario wherein the switched capacitor converter 202 of FIG. 2A operates in a BCM, wherein a duty ratio of the switched capacitor converter 202 of FIG. 2A is greater than 50%. FIG. 19 illustrates a signal waveform diagram depicting a scenario wherein the switched capacitor converter 202 of FIG. 2A operates in a DCM, wherein a duty ratio of the switched capacitor converter 202 of FIG. 2A is greater than 50%.

Figure 20:
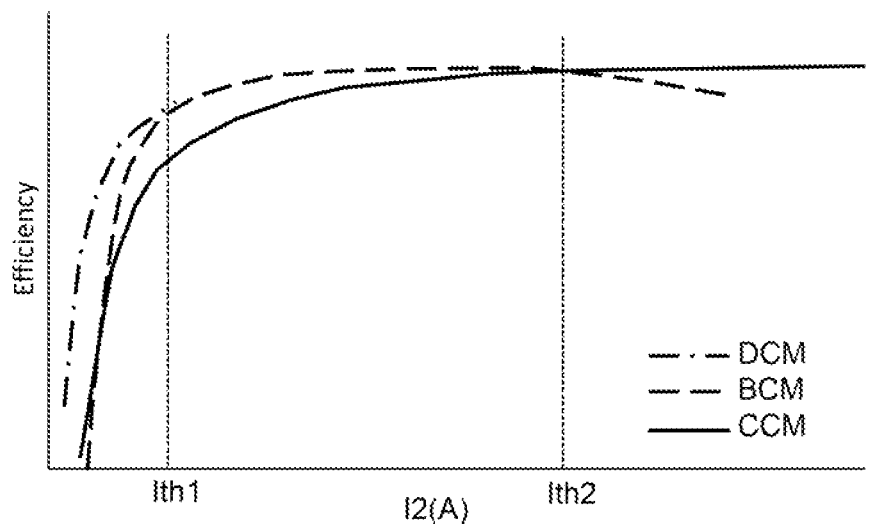
FIG. 20 illustrates a relationship diagram of second current versus efficiency when a switched capacitor voltage converter circuit operates in a boundary conduction mode (BCM), a discontinuous conduction mode (DCM) and a continuous conduction mode (CCM).

FIG. 20 illustrates a relationship diagram of second current versus efficiency in a case when a switched capacitor voltage converter circuit operates in a boundary conduction mode (BCM), a discontinuous conduction mode (DCM) and a continuous conduction mode (CCM). Please refer to FIG. 20 along with FIG. 2B. When the output current I2 or the output current related signal I2r is lower than a first current threshold Ith1, the control circuit 201 controls the switched capacitor converter 202 to operate in the DCM. When the output current I2 or the output current related signal I2r is higher than a second current threshold Ith2, the control circuit 201 controls the switched capacitor converter 202 to operate in the CCM. When the output current I2 or the output current related signal I2r lies between the first current threshold Ith1 and the second current threshold Ith2, the control circuit 201 controls the switched capacitor converter 202 to operate in the BCM.

Figure 21:
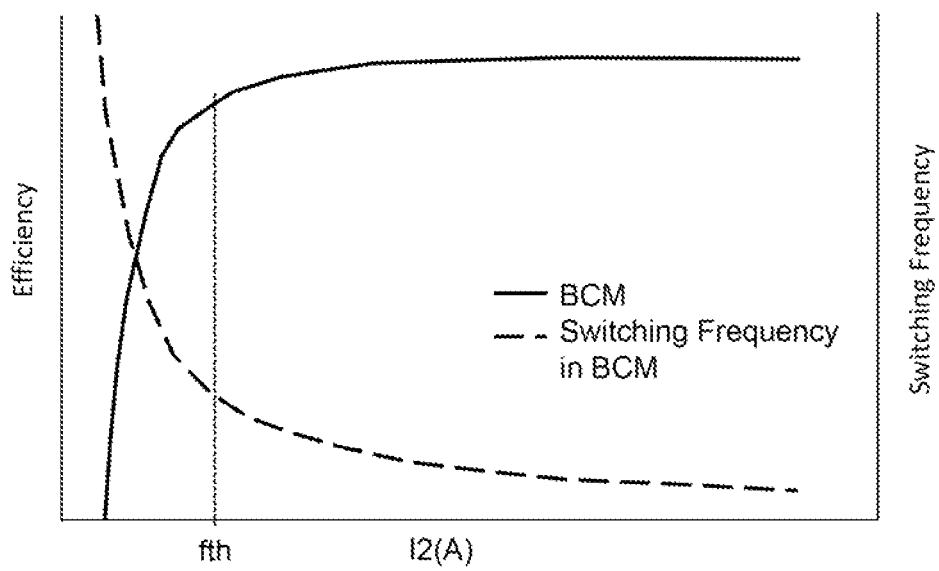
FIG. 21 illustrates a relationship diagram of second current versus switching frequency versus an efficiency when a switched capacitor voltage converter circuit operates in a BCM.

FIG. 21 illustrates a relationship diagram of second current versus switching frequency or efficiency in a case when a switched capacitor voltage converter circuit operates in a BCM. Please refer to FIG. 21 along with FIG. 2A and FIG. 2B. The control circuit 201 is configured to operably decide whether the switched capacitor converter 202 operates in the BCM, in the DCM or in the CCM further according to (1) and (2) below: (1) a switching frequency fsw of the switch Q1, the switch Q2, the switch Q3 or the switch Q4; and (2) the output current I2 or the output current related signal I2r. In one embodiment, when the switching frequency fsw is higher than a predetermined frequency threshold fth, the control circuit 201 controls the switched capacitor converter 202 to cease operating in the BCM.

Figure 22:
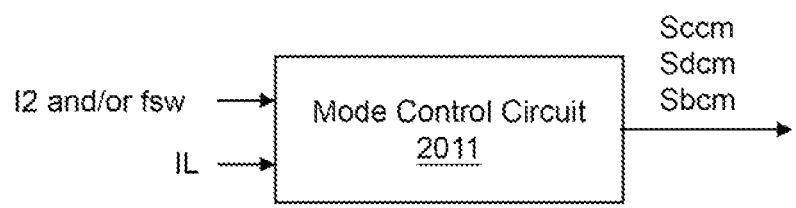
FIG. 22 shows a schematic block diagram of a mode control circuit of a control circuit in a switched capacitor voltage converter circuit according to an embodiment of the present invention.

FIG. 22 shows a schematic block diagram of a mode control circuit of a control circuit in a switched capacitor voltage converter circuit according to an embodiment of the present invention. As shown in FIG. 22, the mode control circuit 2011 is configured to generate a boundary conduction signal Sbcm, a discontinuous conduction signal Sdcm or a continuous conduction signal Sccm in accordance with the output current I2 or the output current related signal I2r (for example but not limited to the inductor current IL) and/or the switching frequency fsw.

Figure 23:
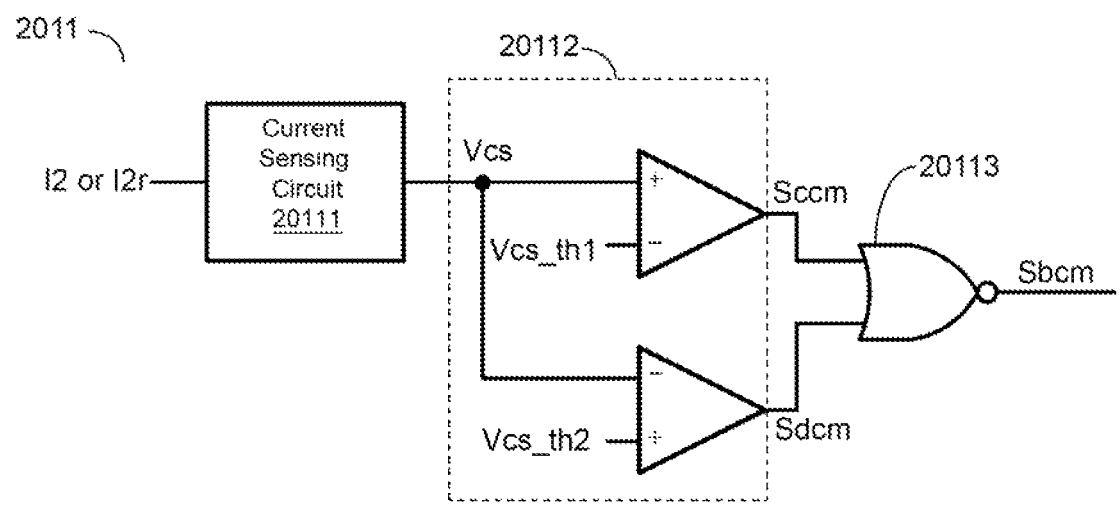
FIG. 23 shows a schematic circuit block diagram of a mode control circuit of a control circuit in a switched capacitor voltage converter circuit according to an embodiment of the present invention.

FIG. 23 shows a schematic circuit block diagram of a mode control circuit of a control circuit in a switched capacitor voltage converter circuit according to an embodiment of the present invention. As shown in FIG. 23, the mode control circuit 2011 includes: a current sensing circuit 20111, a comparison circuit 20112 and an NOR gate 20113. The current sensing circuit 20111 is configured to operably sense the output current I2 or the output current related signal I2r, to generate a current sensing signal Vcs. The comparison circuit 20112 is configured to operably compare the current sensing signal Vcs with a first current threshold Vcs_th1 and a second current threshold Vcs_th2, to generate the boundary conduction signal Sbcm, the discontinuous conduction signal Sdcm or the continuous conduction signal Sccm. When the current sensing signal Vcs is greater than the first current threshold Vcs_th1, the continuous conduction signal Sccm is switched to enable level, so that the switched capacitor converter 202 operates in the CCM. When the current sensing signal Vcs is smaller than the second current threshold Vcs_th2, the discontinuous conduction signal Sdcm is switched to enable level, so that the switched capacitor converter 202 operates in the DCM. When the current sensing signal Vcs lies between the first current threshold Vcs_th1 and the second current threshold Vcs_th2, the boundary conduction signal Sbcm is switched to enable level, so that the switched capacitor converter 202 operates in the BCM.

Figure 24:
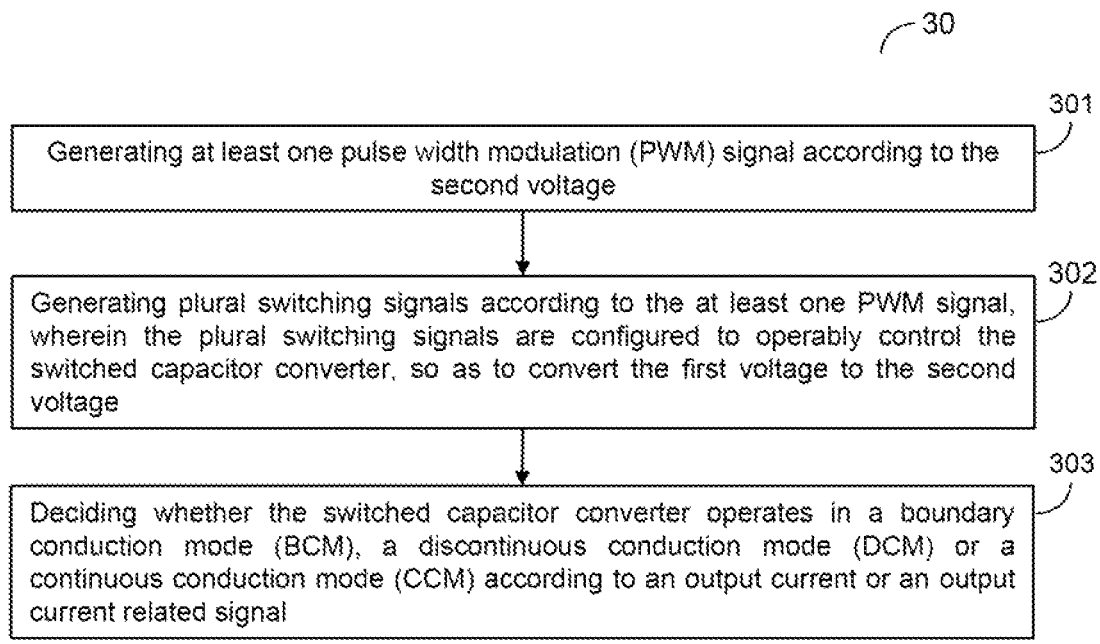
FIG. 24 to FIG. 35 illustrate flow chart diagrams depicting the steps of a control method of a switched capacitor converter according to the present invention.

FIG. 24 to FIG. 35 illustrate flow chart diagrams depicting the steps of a control method of a switched capacitor converter. As shown in FIG. 24, the control method 30 of the switched capacitor converter of the present invention includes: a step 301, a step 302 and a step 303. The step 301 includes: generating at least one pulse width modulation (PWM) signal according to the second voltage. Next, the control method 30 proceeds to the step 302, which includes: generating plural switching signals according to the at least one PWM signal, wherein the plural switching signals are configured to operably control the switched capacitor converter, so as to convert the first voltage to the second voltage. Next, the control method 30 proceeds to the step 303, which includes: deciding whether the switched capacitor converter operates in a boundary conduction mode (BCM), a discontinuous conduction mode (DCM) or a continuous conduction mode (CCM) according to an output current or an output current related signal.

Figure 25:
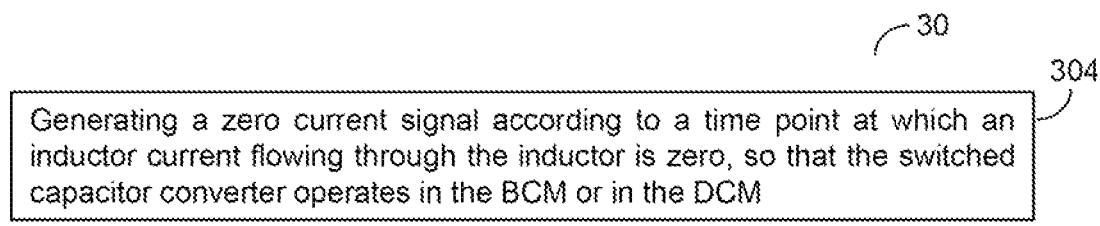
Figure 26:
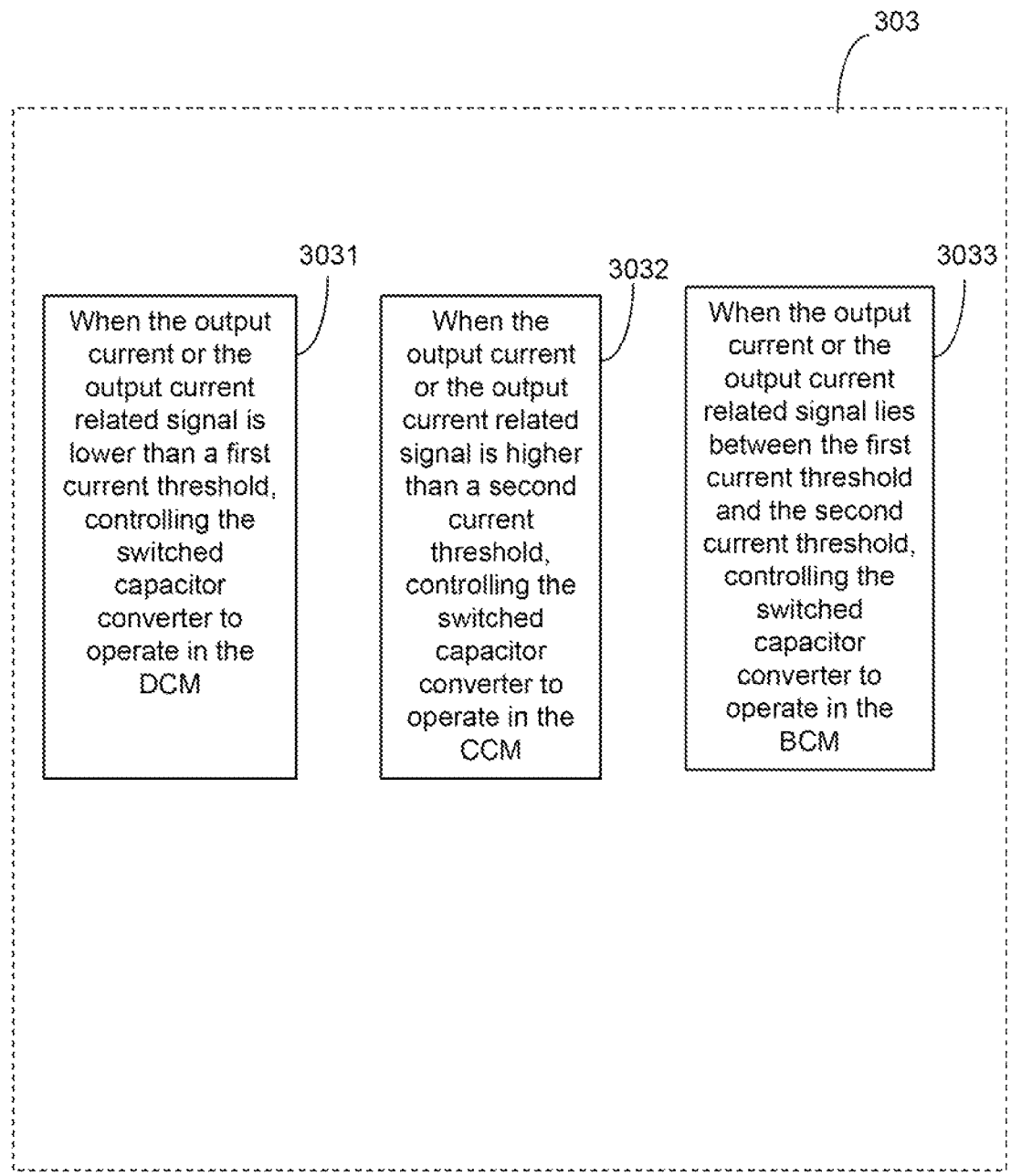

As shown in FIG. 25, in one embodiment, the control method 30 of the switched capacitor converter of the present invention further includes a step 304 (other steps are omitted in the figure for simplicity, the same hereinafter), which includes: generating a zero current signal according to a time point at which an inductor current flowing through the inductor is zero current, so that the switched capacitor converter operates in the BCM or in the DCM. As shown in FIG. 26, In one embodiment, the step 303 includes: a step 3031, a step 3032 and a step 3033. The step 3031 includes: when the output current or the output current related signal is lower than a first current threshold, controlling the switched capacitor converter to operate in the DCM. The step 3032 includes: when the output current or the output current related signal is higher than a second current threshold, controlling the switched capacitor converter to operate in the CCM. The step 3033 includes: when the output current or the output current related signal lies between the first current threshold and the second current threshold, controlling the switched capacitor converter to operate in the BCM.

Figure 27:
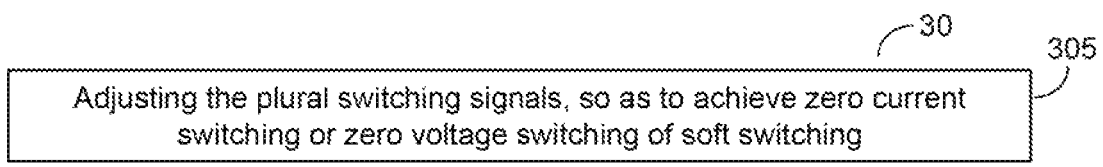
Figure 28:
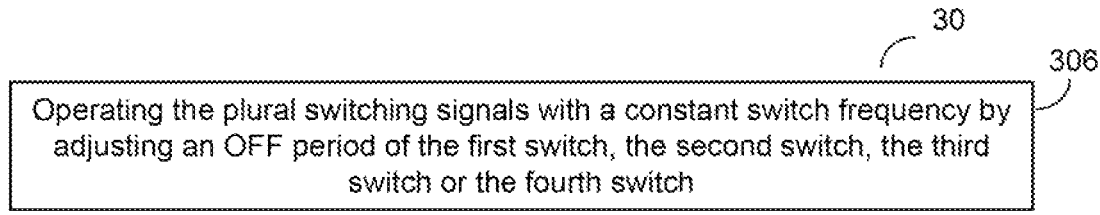
Figure 29:
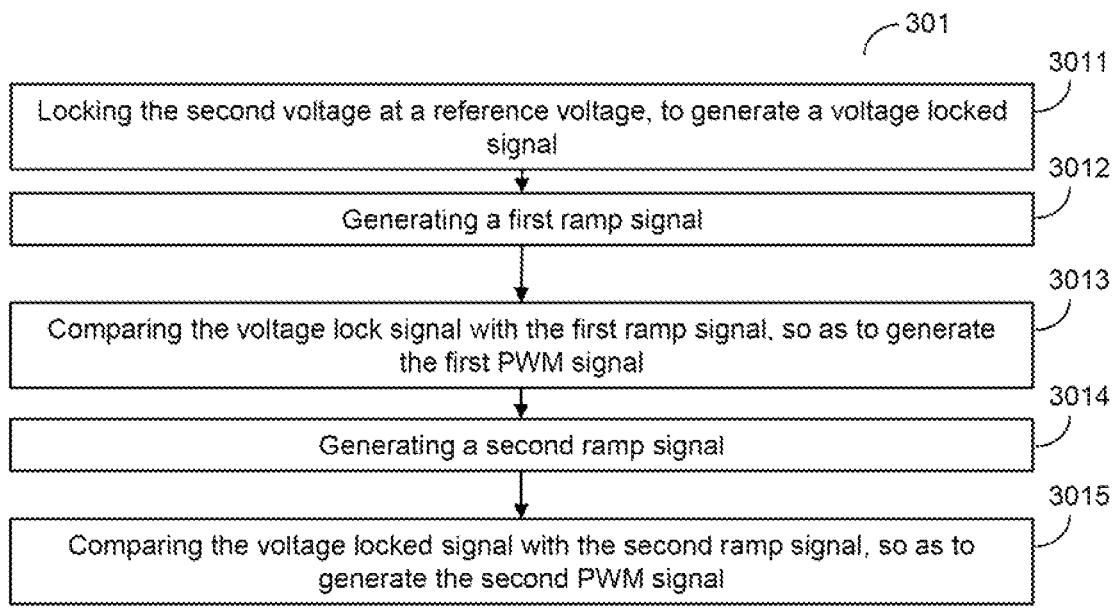

As shown in FIG. 27, in one embodiment, the control method of the switched capacitor converter of the present invention includes a step 305, which includes: adjusting the plural switching signals, so as to achieve zero current switching or zero voltage switching of soft switching. As shown in FIG. 28, in one embodiment, the control method 30 of the switched capacitor converter of the present invention further includes a step 306, which includes: operating the plural switching signals with a constant switch frequency by adjusting an OFF period of the first switch, the second switch, the third switch or the fourth switch. As shown in FIG. 29, In one embodiment, the step 301 includes: a step 3011, a step 3012, a step 3013, a step 3014 and a step 3015. The step 3011 includes: locking the second voltage at a reference voltage, to generate a voltage locked signal. Next, the control method 30 proceeds to the step 3012, which includes: generating a first ramp signal. Next, the control method 30 proceeds to the step 3013, which includes: comparing the voltage locked signal with the first ramp signal, so as to generate the first PWM signal. Next, the control method 30 proceeds to the step 3014, which includes: generating a second ramp signal. Further next, the control method 30 proceeds to the step 3015, which includes: comparing the voltage locked signal with the second ramp signal, so as to generate the second PWM signal.

Figure 30:
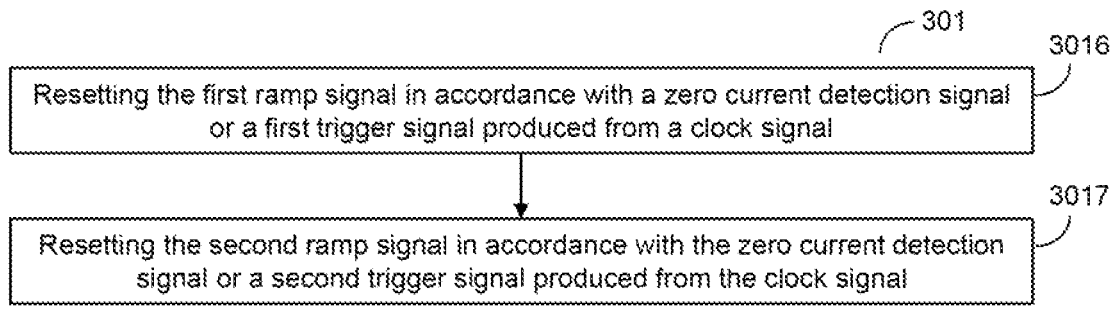
Figure 31:
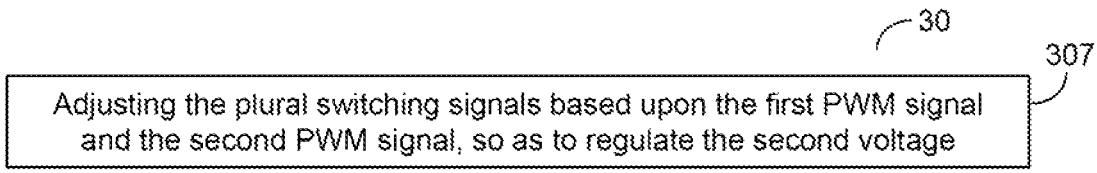
Figure 32:
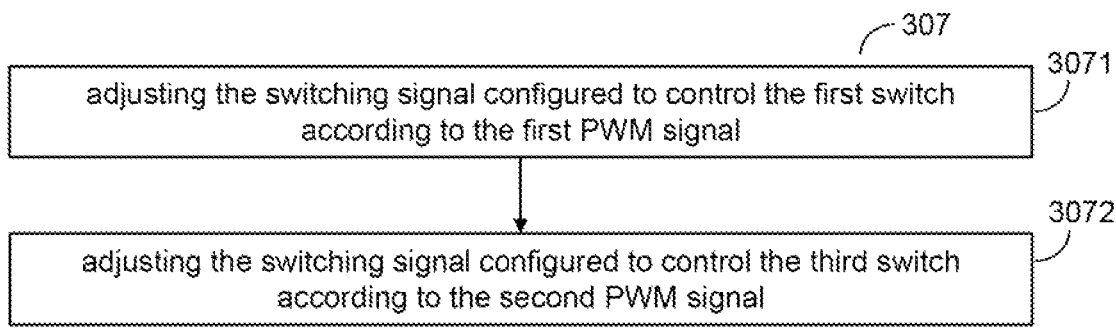

As shown in FIG. 30, In one embodiment, the step 301 further includes: a step 3016 and a step 3017. The step 3016 includes: resetting the first ramp signal in accordance with a zero current detection signal or a first trigger signal generated from a clock signal. Next, the control method 30 proceeds to the step 3017, which includes: resetting the second ramp signal in accordance with the zero current detection signal or a second trigger signal generated from the clock signal. As shown in FIG. 31, in one embodiment, the control method 30 of the switched capacitor converter of the present invention further includes a step 307, which includes: adjusting the plural switching signals according to the first PWM signal and the second PWM signal, so as to regulate the second voltage. As shown in FIG. 32, in one embodiment, the step 307 includes: a step 3071 and a step 3072. The step 3071 includes: adjusting the switching signal configured to control the first switch according to the first PWM signal. Next, the control method 30 proceeds to the step 3072, which includes: adjusting the switching signal configured to control the third switch according to the second PWM signal.

Figure 33:
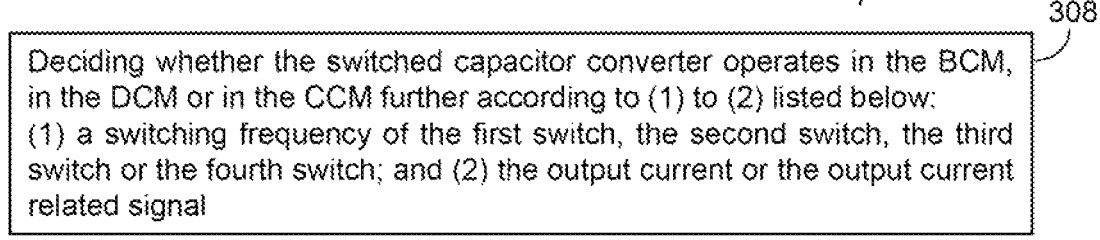
Figure 34:
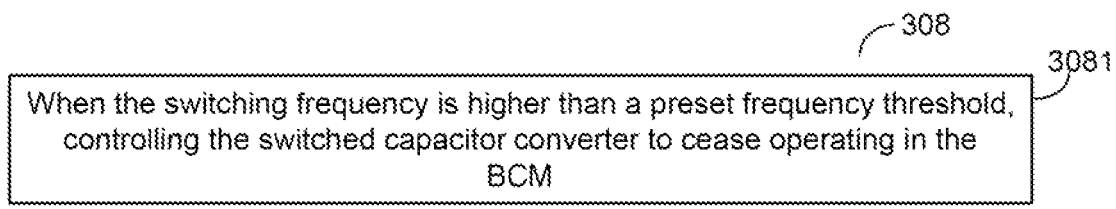

As shown in FIG. 33, in one embodiment, the control method 30 of the switched capacitor converter of the present invention further includes a step 308, which includes: deciding whether the switched capacitor converter operates in the BCM, in the DCM or in the CCM further according to (1) and (2) below: (1) a switching frequency of the first switch, the second switch, the third switch or the fourth switch; and (2) the output current or the output current related signal. As shown in FIG. 34, in one embodiment, the step 308 further includes a step 3081, which includes: when the switching frequency is higher than a predetermined frequency threshold, controlling the switched capacitor converter to cease operating in the BCM.

Figure 35:
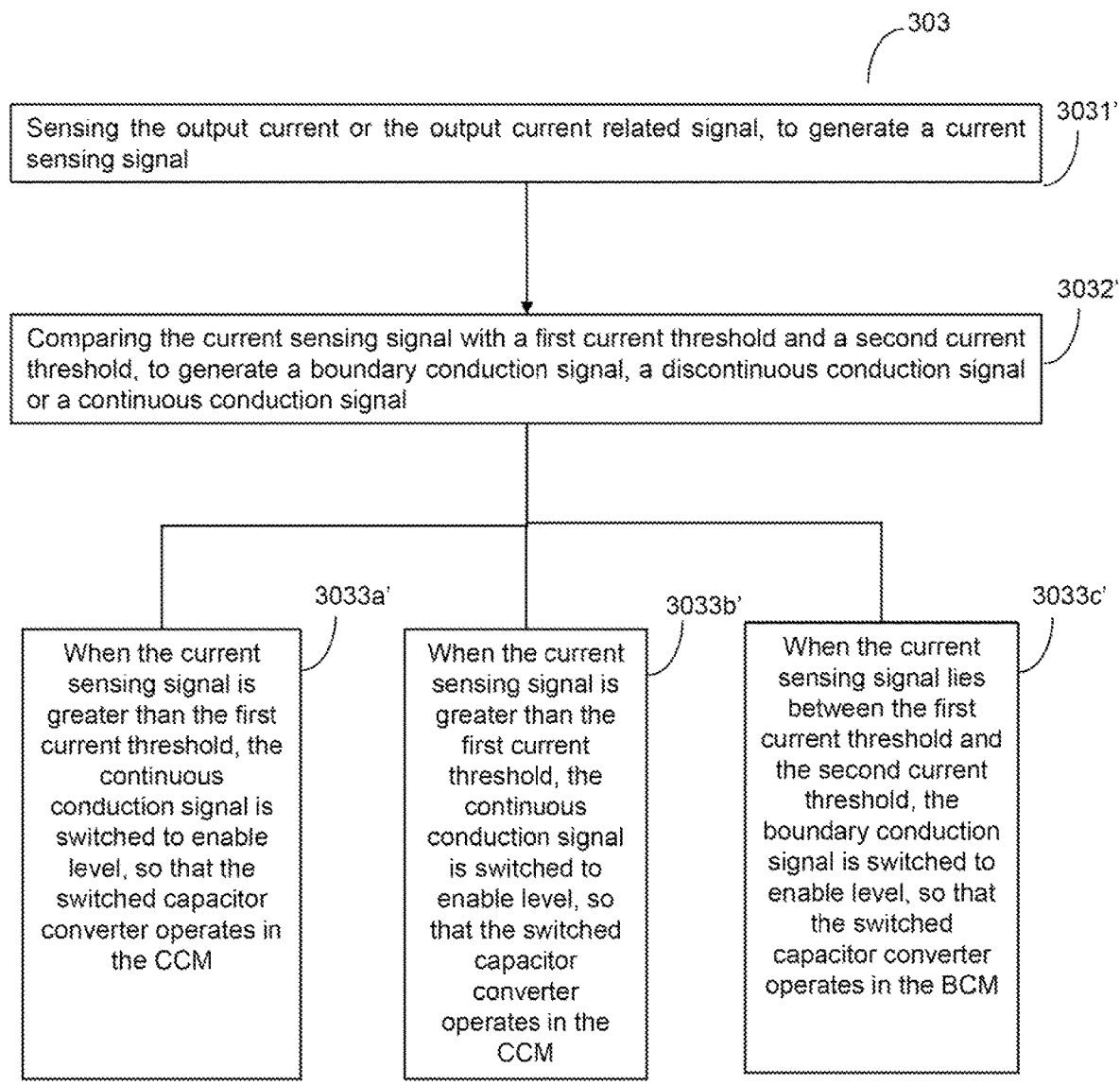

As shown in FIG. 35, In one embodiment, the step 303 further includes: a step 3031', a step 3032', a step 3033a', a step 3033b' and a step 3033c'. The step 3031' includes: sensing the output current or the output current related signal, to generate a current sensing signal. Next, the control method 30 proceeds to the step 3032', which includes: comparing the current sensing signal with a first current threshold and a second current threshold, to generate a boundary conduction signal, a discontinuous conduction signal or a continuous conduction signal. The step 3033a' includes: when the current sensing signal is smaller than the second current threshold, the discontinuous conduction signal is switched to enable level, so that the switched capacitor converter operates in the DCM. The step 3033b' includes: when the current sensing signal is greater than the first current threshold, the continuous conduction signal is switched to enable level, so that the switched capacitor converter operates in the CCM. The step 3033c' includes: when the current sensing signal lies between the first current threshold and the second current threshold, the boundary conduction signal is switched to enable level, so that the switched capacitor converter operates in the BCM.

The present invention has provided a switched capacitor voltage converter circuit and a control method of a switched capacitor converter as described above. Advantages of the present invention include: that, the present invention can automatically switch among a boundary conduction mode (BCM), a discontinuous conduction mode (DCM) and a continuous conduction mode (CCM), so as to optimize efficiency; and that, the present invention can flexibly switch among different operation modes according to an output current or a switching frequency; and that, when the present invention operates in the BCM or in the DCM, it is not required for the present invention to execute voltage balancing for the flying capacitor; and that, the present invention can accomplish zero current switching or zero voltage switching, so as to reduce power loss during switching; and that, the present invention can adaptively adjust the switching frequency when operating in the BCM; and that, the present invention has a better efficiency, as compared to prior art three-level buck converters.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switched capacitor voltage converter circuit, which is configured to convert a first voltage to a second voltage; the switched capacitor voltage converter circuit comprising:
   an output capacitor, which is configured to generate the second voltage;
   a switched capacitor converter, which is coupled between the first voltage and the second voltage, wherein the switched capacitor converter includes:
      a switching circuit including a first switch, a second switch, a third switch and a fourth switch, wherein the first switch is coupled to the first voltage, so that the first switch is configured to receive the first voltage;
      an inductor, which is coupled between the output capacitor and the switching circuit; and
      a flying capacitor coupled to the switch circuit, wherein the flying capacitor and the output capacitor constitute a voltage divider; and
   a control circuit, which is configured to generate at least one pulse width modulation (PWM) signal according to the second voltage, and the control circuit is configured to generate a plurality of switching signals according to the at least one PWM signal, wherein the plurality of switching signals are configured to control the first switch, the second switch, the third switch and the fourth switch in the switching circuit, so as to convert the first voltage to the second voltage;
   wherein the control circuit is configured to decide whether the switched capacitor converter operates in a boundary conduction mode (BCM), a discontinuous conduction mode (DCM) or a continuous conduction mode (CCM) according to an output current or an output current related signal;
   wherein the control circuit is further configured to generate a zero current signal according to a time point at which an inductor current flowing through the inductor is zero current, so that the switched capacitor converter operates in the BCM or in the DCM;
   wherein the control circuit includes a PWM circuit, which is configured to generate the at least one PWM signal according to the second voltage, wherein the at least one PWM signal includes a first PWM signal, wherein the PWM circuit includes:
      a lock-up circuit, which is configured to lock the second voltage at a reference voltage, to generate a voltage locked signal;
      a first ramp circuit, which is configured to generate a first ramp signal; and
      a first comparison circuit, which is configured to compare the voltage locked signal with the first ramp signal, so as to generate the first PWM signal;
   wherein the at least one PWM signal includes a second PWM signal, wherein the PWM circuit further includes:
      a second ramp circuit, which is configured to generate a second ramp signal; and
      a second comparison circuit, which is configured to compare the voltage locked signal with the second ramp signal, so as to generate the second PWM signal;
   wherein the second ramp signal has a first phase-shift relative to the first ramp signal;
   wherein the first ramp circuit includes a first reset circuit, which is configured to reset the first ramp signal in accordance with a zero current detection signal or a first trigger signal generated from a clock signal;
   wherein the second ramp circuit includes a second reset circuit, which is configured to reset the second ramp signal in accordance with the zero current detection signal or a second trigger signal generated from the clock signal;
   wherein the second trigger signal has a second phase-shift relative to the first trigger signal;
   wherein the control circuit further includes a mode control circuit, which is configured to decide whether the switched capacitor converter operates in the BCM, in the DCM or in the CCM according to the output current or the output current related signal, wherein the mode control circuit includes:
      a current sensing circuit, which is configured to sense the output current or the output current related signal, to generate a current sensing signal; and
      a comparison circuit, which is configured to compare the current sensing signal with a first current threshold and a second current threshold, to generate a boundary conduction signal, a discontinuous conduction signal or a continuous conduction signal;
   wherein when the current sensing signal is greater than the first current threshold, the continuous conduction signal is switched to an enable level, so that the switched capacitor converter operates in the CCM;
   wherein when the current sensing signal is smaller than the second current threshold, the discontinuous conduction signal is switched to the enable level, so that the switched capacitor converter operates in the DCM; and
   wherein when the current sensing signal lies between the first current threshold and the second current threshold, the boundary conduction signal is switched to the enable level, so that the switched capacitor converter operates in the BCM.

2. The switched capacitor voltage converter circuit as recited in claim 1, wherein the control circuit is configured to adjust the plurality of switching signals, so as to accomplish zero current switching or zero voltage switching of soft switching.

3. The switched capacitor voltage converter circuit as recited in claim 1, wherein the control circuit operates with a constant switch frequency by adjusting an OFF period of the first switch, the second switch, the third switch or the fourth switch.

4. The switched capacitor voltage converter circuit as recited in claim 1, wherein an amount of the first phase-shift is equal to an amount of the second phase-shift.

5. The switched capacitor voltage converter circuit as recited in claim 1, wherein the plurality of switching signals are adjusted according to the first PWM signal and the second PWM signal, so as to regulate the second voltage.

6. The switched capacitor voltage converter circuit as recited in claim 1, wherein the third switch is coupled between the first switch and the inductor, so that a switching signal of the plurality of switching signals that is configured to control the first switch is adjusted according to the first PWM signal, whereas, a second switching signal of the plurality of switching signals that is configured to control the third switch is adjusted according to the second PWM signal.

7. The switched capacitor voltage converter circuit as recited in claim 1, wherein the control circuit is configured to decide whether the switched capacitor converter operates in the BCM, in the DCM or in the CCM further according to:
a switching frequency of the first switch, the second switch, the third switch or the fourth switch; and
the output current or the output current related signal.

8. The switched capacitor voltage converter circuit as recited in claim 7, wherein when the switching frequency is higher than a predetermined frequency threshold, the control circuit controls the switched capacitor converter to cease operating in the BCM.

9. The switched capacitor voltage converter circuit as recited in claim 1, wherein in the CCM:
a time point at which the plurality of switching signals are switched to the enable level is determined by the clock signal or is determined by the first ramp signal and the voltage locked signal, or the second ramp signal and the voltage locked signal;
a time point at which the plurality of switching signals are switched to a disable level is determined by the clock signal or is determined by the first ramp signal and the voltage locked signal, or the second ramp signal and the voltage locked signal.

10. The switched capacitor voltage converter circuit as recited in claim 1, wherein in the DCM:
a time point at which the plurality of switching signals are switched to the enable level is determined by the clock signal or is determined by the first ramp signal and the voltage locked signal, or the second ramp signal and the voltage locked signal;
a time point at which the plurality of switching signals are switched to a disable level is determined by the clock signal or is determined by the first ramp signal and the voltage locked signal, or the second ramp signal and the voltage locked signal.

11. The switched capacitor voltage converter circuit as recited in claim 1, wherein in the BCM:
a time point at which the plurality of switching signals are switched to the enable level is determined by a zero current detection signal or is determined by the first ramp signal and the voltage locked signal, or the second ramp signal and the voltage locked signal;
a time point at which the plurality of switching signals are switched to a disable level is determined by the zero current detection signal or is determined by the first ramp signal and the voltage locked signal, or the second ramp signal and the voltage locked signal.

12. A control method of a switched capacitor converter, which is configured to convert a first voltage to a second voltage; the switched capacitor converter includes:
a switching circuit including a first switch, a second switch, a third switch and a fourth switch, wherein the first switch is coupled to the first voltage, so that the first switch is configured to receive the first voltage;
an inductor, which is coupled between an output capacitor and the switching circuit; and
a flying capacitor coupled to the switch circuit, wherein the flying capacitor and the output capacitor constitute a voltage divider; and
the control method of the switched capacitor converter comprising following steps:
generating at least one pulse width modulation (PWM) signal according to the second voltage;
generating a plurality of switching signals according to the at least one PWM signal, wherein the plurality of switching signals are configured to control the switched capacitor converter, so as to convert the first voltage to the second voltage;
deciding whether the switched capacitor converter operates in a boundary conduction mode (BCM), a discontinuous conduction mode (DCM) or a continuous conduction mode (CCM) according to an output current or an output current related signal;
generating a zero current signal according to a time point at which an inductor current flowing through the inductor is zero current, so that the switched capacitor converter operates in the BCM or in the DCM;
wherein the at least one PWM signal includes a first PWM signal and a second PWM signal, wherein the step for generating the at least one PWM signal according to the second voltage includes following steps:
locking the second voltage at a reference voltage, to generate a voltage locked signal;
generating a first ramp signal;
comparing the voltage locked signal with the first ramp signal, to generate the first PWM signal;
generating a second ramp signal; and
comparing the voltage locked signal with the second ramp signal, to generate the second PWM signal;
wherein the second ramp signal has a first phase-shift relative to the first ramp signal;
wherein the step for generating the at least one PWM signal according to the second voltage further includes following steps:
resetting the first ramp signal in accordance with a zero current detection signal or a first trigger signal generated from a clock signal; and
resetting the second ramp signal in accordance with the zero current detection signal or a second trigger signal generated from the clock signal;
wherein the second trigger signal has a second phase-shift relative to the first trigger signal;
wherein the step for deciding whether the switched capacitor converter operates in the BCM, the DCM or the CCM according to the output current or the output current related signal further includes following steps:
sensing the output current or the output current related signal, to generate a current sensing signal; and
comparing the current sensing signal with a first current threshold and a second current threshold, to generate a boundary conduction signal, a discontinuous conduction signal or a continuous conduction signal;
wherein when the current sensing signal is greater than the first current threshold, the continuous conduction signal is switched to an enable level, so that the switched capacitor converter operates in the CCM;

wherein when the current sensing signal is smaller than the second current threshold, the discontinuous conduction signal is switched to the enable level, so that the switched capacitor converter operates in the DCM; and wherein when the current sensing signal lies between the first current threshold and the second current threshold, the boundary conduction signal is switched to the enable level, so that the switched capacitor converter operates in the BCM.

13. The control method of the switched capacitor converter as recited in claim 12, further comprising:
adjusting the plurality of switching signals, so as to accomplish zero current switching or zero voltage switching of soft switching.

14. The control method of the switched capacitor converter as recited in claim 12, further comprising:
operating the plurality of switching signals with a constant switch frequency by adjusting an OFF period of the first switch, the second switch, the third switch or the fourth switch.

15. The control method of the switched capacitor converter as recited in claim 12, wherein an amount of the first phase-shift is equal to an amount of the second phase-shift.

16. The control method of the switched capacitor converter as recited in claim 12, further comprising:
adjusting the plurality of switching signals according to the first PWM signal and the second PWM signal, so as to regulate the second voltage.

17. The control method of the switched capacitor converter as recited in claim 16, wherein the third switch is coupled between the first switch and the inductor, wherein the step for adjusting the plurality of switching signals according to the first PWM signal and the second PWM signal includes following steps:
adjusting a switching signal of the plurality of switching signals that is configured to control the first switch according to the first PWM signal; and
adjusting a second switching signal of the plurality of switching signals that is configured to control the third switch according to the second PWM signal.

18. The control method of the switched capacitor converter as recited in claim 12, wherein the control method of the switched capacitor converter further comprises following steps:
deciding whether the switched capacitor converter operates in the BCM, in the DCM or in the CCM further according to:
a switching frequency of the first switch, the second switch, the third switch or the fourth switch; and
the output current or the output current related signal.

19. The control method of the switched capacitor converter as recited in claim 18, wherein the step for deciding whether the switched capacitor converter operates in the BCM, in the DCM or in the CCM further includes:
when the switching frequency is higher than a predetermined frequency threshold, controlling the switched capacitor converter to cease operating in the BCM.

* * * * *